(12) United States Patent
Blakeway

(10) Patent No.: US 7,446,656 B2
(45) Date of Patent: Nov. 4, 2008

(54) ELECTRONIC LOCATION MONITORING SYSTEM

(75) Inventor: Douglas H. Blakeway, Surrey (CA)

(73) Assignee: Strategic Technologies Inc., Surrey, British Columbia (CA)

( * ) Notice: Subject to any disclaimer, the term of this patent is extended or adjusted under 35 U.S.C. 154(b) by 435 days.

(21) Appl. No.: 10/569,584

(22) PCT Filed: Aug. 20, 2004

(86) PCT No.: PCT/CA2004/001504

§ 371 (c)(1),
(2), (4) Date: Feb. 22, 2006

(87) PCT Pub. No.: WO2005/020178

PCT Pub. Date: Mar. 3, 2005

(65) Prior Publication Data

US 2006/0261939 A1 Nov. 23, 2006

Related U.S. Application Data

(60) Provisional application No. 60/497,017, filed on Aug. 22, 2003.

(51) Int. Cl.
G08B 1/08 (2006.01)
(52) U.S. Cl. .............. 340/539.21; 340/539.23; 340/539.13
(58) Field of Classification Search .............. 340/539.1, 340/539.11, 539.13, 539.14, 539.15, 539.21, 340/539.23, 573.1, 573.3, 573.4, 691.1; 455/436, 455/437, 557
See application file for complete search history.

(56) References Cited

U.S. PATENT DOCUMENTS

| 4,918,432 A | 4/1990 | Pauley et al. |
| 5,021,765 A | 6/1991 | Morgan |
| 5,255,306 A | 10/1993 | Melton et al. |
| 5,461,390 A | 10/1995 | Hoshen |
| 5,537,102 A | 7/1996 | Pinnow |

(Continued)

FOREIGN PATENT DOCUMENTS

CA 2332576 12/1999

(Continued)

OTHER PUBLICATIONS

International Search Report for PCT/CA2004/001504 dated Jan. 25, 2005.

(Continued)

*Primary Examiner*—Van T. Trieu
(74) *Attorney, Agent, or Firm*—Kolisch Hartwell, P.C.

(57) ABSTRACT

A method and apparatus for operating a monitoring unit operable to receive signals from a mobile transmitter in an electronic location monitoring system involves causing a first receiver to change a signal reception threshold thereof for receiving signals from the mobile transmitter, in response to proximity of the monitoring unit relative to a reference position whereby the receiver rejects signals received from the mobile transmitter that have a signal strength below the signal reception threshold and receives and processes signals received from the mobile transmitter that have a signal strength above the signal reception threshold. Alternatively, detection of a first monitoring unit in proximity to a second monitoring unit may cause the second monitoring unit to take over receiving signals from the mobile transmitter while the first monitoring unit is put into a low power mode.

114 Claims, 6 Drawing Sheets

U.S. PATENT DOCUMENTS

| | | |
|---|---|---|
| 5,652,570 A | 7/1997 | Lepkofker |
| 5,731,757 A | 3/1998 | Layson, Jr. |
| 5,742,233 A | 4/1998 | Hoffman et al. |
| 5,825,283 A | 10/1998 | Camhi |
| 5,867,103 A | 2/1999 | Taylor, Jr. |
| 5,870,029 A | 2/1999 | Otto et al. |
| 5,889,474 A | 3/1999 | LaDue |
| 5,892,454 A | 4/1999 | Schipper et al. |
| 5,987,379 A | 11/1999 | Smith |
| 6,014,080 A | 1/2000 | Layson, Jr. |
| 6,054,928 A | 4/2000 | Lemelson et al. |
| 6,072,396 A | 6/2000 | Gaukel |
| 6,181,253 B1 | 1/2001 | Eschenbach et al. |
| 6,195,552 B1 * | 2/2001 | Jeong et al. ............... 455/436 |
| 6,243,039 B1 | 6/2001 | Elliot |
| 6,437,696 B1 | 8/2002 | Lemelson et al. |
| 6,606,556 B2 | 8/2003 | Curatolo et al. |
| 6,775,558 B1 * | 8/2004 | Ranta et al. ............... 455/557 |
| 6,987,978 B2 * | 1/2006 | Masuda et al. ........... 455/456.4 |
| 2001/0032236 A1 | 10/2001 | Lin |

FOREIGN PATENT DOCUMENTS

| | | |
|---|---|---|
| WO | WO 99/12050 | 3/1999 |
| WO | 99/63357 A | 12/1999 |
| WO | WO 01/26067 | 4/2001 |
| WO | WO 01/63318 | 8/2001 |
| WO | WO 03/030108 | 4/2003 |

OTHER PUBLICATIONS

Rajesh Jain, Weblog on Emerging Technologies, Enterprises and Markets, Emergic, ORG: Sep. 12, 2003 Archives.

An European Search Report from corresponding European Patent Application No. EP04761668, mailed Apr. 9, 2008.

* cited by examiner

ELECTRONIC LOCATION MONITORING SYSTEM

CROSS REFERENCE TO RELATED APPLICATION

This application claims priority from U.S. Provisional Application No. 60/497,017 filed on Aug. 22, 2003.

BACKGROUND OF THE INVENTION

1. Field of Invention

This invention relates to remote monitoring and more particularly to remote monitoring in an electronic location monitoring system.

2. Description of Related Art

As an alternative to incarcerating offenders for minor infractions, more and more judicial and law enforcement agencies prefer to place such offenders under house arrest and monitor their movement using electronic location monitoring equipment. As a result, there is less space taken in already overcrowded detention facilities such as prisons, thus eliminating the cost of incarceration, while at the same time allowing offenders to avoid prison and provide them with the opportunity to attend school or earn a wage and participate in counseling or rehabilitation programs.

Electronic location monitoring equipment usually involves the use of an identification tag securely attached to the individual's body, which periodically transmits a unique code to an RF receiver device placed in the incarcerated individual's place of confinement (usually his or her house). The receiver listens for transmissions from the identification tag, and if a transmission is not received within a predetermined amount of time, an event is logged by the receiver indicating that the identification tag, and hence the individual wearing it, is no longer in the vicinity of the receiver. In turn, the receiver transmits a status message to a monitoring station over a communication channel such as the PSTN (Public Switched Telephone Network) indicating the presence or absence of the individual at the monitored site.

The electronic location monitoring approach described above works well to ensure that the individual remains in the monitored area according to the conditions of his/her parole. However, once the individual is away from the monitored site and out of range of the receiver, the individual cannot be reached. Law enforcement agencies usually want to ensure that the individual is at particular locations (not just one monitored site) at particular times. For example the individual may be required to be at work during certain hours, at a counseling workshop during other hours, and at home at all other times. In some cases, it is also necessary to ensure that the individual stays away from certain locations (for e.g., schools, parks, home of an ex-spouse, etc.).

To overcome this problem, systems are known in which an incarcerated individual wears a transmitter and carries a receiver operable to receive signals from the transmitter. The receiver may perform calculations based on position signals it may receive to determine whether the individual is in an allowable location and may permit the individual to venture outside of a single area. One problem with this type of system however is that the individual must carry the receiver with him/her at all times, which can be somewhat inconvenient. For example when the receiver is being charged, the individual must stay relatively near the charger. Consequently, this type of system can be restrictive.

SUMMARY OF THE INVENTION

In accordance with one aspect of the invention, there is provided a method for operating a monitoring unit operable to receive signals from a mobile transmitter in an electronic location monitoring system. The method involves causing a receiver of the monitoring unit to change a signal reception threshold thereof for receiving signals from the mobile transmitter, in response to proximity of the monitoring unit relative to a reference position whereby the receiver rejects signals received from the mobile transmitter that have a signal strength below the signal reception threshold and receives and processes signals received from the mobile transmitter that have a signal strength above the signal reception threshold.

Changing the signal reception threshold may involve causing the receiver to decrease the signal reception threshold when the monitoring unit is in proximity to the reference position and causing the receiver to increase the signal reception threshold when the monitoring unit is not in proximity to the reference position.

The method may involve detecting proximity of the monitoring unit relative to the reference position.

The method may involve producing a proximity signal for reception by the receiver, in response to detecting the change in proximity of the monitoring unit relative to the reference position, whereby the receiver changes the signal reception threshold in response to the proximity signal.

The method may involve causing the proximity signal to indicate the monitoring unit is in proximity to the reference position when the monitoring unit is coupled to a docking station.

The method may involve causing the proximity signal to indicate the monitoring unit is not in proximity to the reference position when the monitoring unit is uncoupled from a docking station.

The method may involve receiving position signals at the monitoring unit, the position signals representing a geographical position of the monitoring unit, and producing the proximity signal in response to the position signals.

The method may involve causing the proximity signal to indicate the monitoring unit is in proximity to the reference position when the position signals meet a first position criterion.

The first position criterion may be met when the position signals indicate the monitoring unit is within a first range of the reference position.

The method may involve causing the proximity signal to indicate the monitoring unit is not in proximity to the reference position when the position signals meet a second position criterion.

The second position criterion may be met when the position signals indicate the monitoring unit is within a second range of the reference position.

In accordance with another aspect of the invention, there is provided an apparatus operable to receive signals from a mobile transmitter in an electronic location monitoring system. The apparatus includes a proximity signal generator operable to generate a proximity signal in response to proximity of the apparatus relative to a reference position, a receiver operable to receive signals from the mobile transmitter, the receiver having a signal reception threshold responsive to the proximity signal, such that the receiver rejects signals from the mobile transmitter that have a signal strength below the signal reception threshold and receives signals from the mobile transmitter that have a signal strength above the signal reception threshold and a processor circuit operable to process signals received by the receiver to produce processed signals, the processor circuit being operable to communicate with a transmitter to cause the transmitter to transmit the processed signals to a monitoring station.

The receiver may be operable to decrease the signal reception threshold when the proximity signal indicates the apparatus is in proximity to the reference position and the receiver may be operable to increase the signal reception threshold when the proximity signal indicates apparatus is not in proximity to the reference position.

The proximity signal generator may comprise a detector operable to detect proximity of the apparatus to the reference position.

The detector may be operable to detect coupling of the apparatus to a docking station, and to cause the proximity signal to indicate the apparatus is in proximity to the reference position when the apparatus is coupled to the docking station.

The detector may be operable to detect uncoupling of the receiver from the docking station and to cause the proximity signal to indicate the apparatus is not in proximity to the reference position when the apparatus is uncoupled from the docking station.

The detector may comprise a position signal receiver operable to receive position signals representing a geographical position of the apparatus, the proximity signal generator being operable to produce the proximity signal in response to the position signals.

The detector may be operable to cause the proximity signal to indicate the apparatus is in proximity to the reference position when the position signals meet a first position criterion.

The detector may be configured to determine the first position criterion is met when the position signals indicate the apparatus is within a first range of the reference position.

The detector may be operable to cause the proximity signal to indicate the apparatus is not in proximity to the reference position when the position signals meet a second position criterion.

The detector may be configured to determine the second position criterion is met when the position signals indicate the apparatus is within a second range of the reference position.

The position signal receiver may comprise a global positioning system (GPS) signal receiver.

The position signal receiver may include a wireless receiver operable to receive position signals from a wireless communication network.

The position signal receiver may comprise a message receiver operable to receive messages from a messaging system.

The message receiver may be operable to receive a message compatible with the SMS message format or the GPRS/CDMA 1X, CDPD, Mobitex, or 1XRTT data packet format, or any other suitable format.

The apparatus may be incorporated into a modular battery unit.

The apparatus may further include a first mobile wireless transceiver powered by the modular battery unit and in communication with the apparatus such that the wireless transceiver is operable to transmit the processed signals to the monitoring station.

The processor circuit may be configured to implement a portion of the proximity signal generator.

The processor circuit may be configured to cause the processed signals to include a representation of the proximity signal.

In accordance with another aspect of the invention, there is provided an apparatus operable to receive signals from a mobile transmitter in an electronic location monitoring system. The apparatus includes provisions for generating a proximity signal in response to proximity of the apparatus relative to a reference position, provisions for receiving signals from the mobile transmitter, the provisions for receiving having a signal reception threshold responsive to the proximity signal, such that signals from the mobile transmitter that have a signal strength below the signal reception threshold are rejected and such that signals from the mobile transmitter that have a signal strength above the signal reception threshold are received and provisions for processing signals received by the receiver to produce processed signals, the provisions for processing being operable to communicate with a transmitter to cause the transmitter to transmit the processed signals to a monitoring station.

The provisions for receiving may be operable to decrease the signal reception threshold when the proximity signal indicates the apparatus is in proximity to the reference position and operable to increase the signal reception threshold when the proximity signal indicates apparatus is not in proximity to the reference position.

In accordance with another aspect of the invention, there is provided a method for switching monitoring units in an electronic location monitoring system comprising a mobile transmitter operable to transmit to at least one of first and second monitoring units operable to communicate with a common monitoring station. The method involves detecting proximity of the first monitoring unit relative to the second monitoring unit, producing a proximity signal in response to detecting proximity of the first monitoring unit relative to the second monitoring unit, for reception by the first monitoring unit to cause the first monitoring unit to enter a receive mode in which processing of signals received from the mobile transmitter by the first monitoring unit is permitted when the first monitoring unit is not in proximity to the second monitoring unit or a low power mode in which processing of signals received from the mobile transmitter by the first monitoring unit is prevented when the first monitoring unit is in proximity to the second monitoring unit and causing the second monitoring unit to receive and process signals from the mobile transmitter when the proximity signal indicates the first monitoring unit is in proximity to the second monitoring unit and causing the second monitoring unit to cease receiving signals from the mobile transmitter when the proximity signal indicates the first monitoring unit is not in proximity to the second monitoring unit.

The method may involve causing the proximity signal to indicate the first monitoring unit is in proximity to the second monitoring unit when the first monitoring unit is coupled to a docking station associated with the second monitoring unit.

The method may involve causing the proximity signal to indicate the first monitoring unit is not in proximity to the second monitoring unit when the first monitoring unit is uncoupled from a docking station associated with the second monitoring unit.

Detecting may involve measuring, near the second monitoring unit, signal strength of signals received from the mobile transmitter, and wherein the proximity signal is produced in response to measured signal strength.

The method may involve causing the proximity signal to indicate the first monitoring unit is in proximity to the second monitoring unit when measured signal strength meets a first signal strength criterion.

The first signal strength criterion may be met when the measured signal strength is above a first signal strength threshold value.

The method may involve causing the proximity signal to indicate the first monitoring unit is not in proximity to the second monitoring unit when measured signal strength meets a second signal strength criterion.

The second signal strength criterion may be met when the measured signal strength is below a second signal strength threshold value.

The first and second signal strength threshold values may be the same.

Detecting may comprise receiving position signals at the first monitoring unit, the position signals representing a geographical position of the first monitoring unit, and producing the proximity signal in response to the position signals.

The method may involve causing the proximity signal to indicate the first monitoring unit is in proximity to the second monitoring unit when the position signals meet a first position criterion.

The first position criterion may be met when the position signals indicate the first monitoring unit is within a first range of a reference position.

The method may involve causing the proximity signal to indicate the first monitoring unit is not in proximity to the second monitoring unit when the position signals meet a second position criterion.

The second position criterion may be met when the position signals indicate the first monitoring unit is within a second range of the reference position.

The reference position may represent an approximate geographical position of the second monitoring unit.

Producing the proximity signal may comprise causing a message to be transmitted to the first monitoring unit.

The method may involve causing a message to be transmitted to the first monitoring unit through a messaging service.

Causing a message to be transmitted to the first monitoring unit through a messaging service may involve causing a message compatible with the SMS message format or the GPRS/CDMA 1X, CDPD, Mobitex, or 1XRTT data packet format, or any other suitable format to be transmitted to the first monitoring unit.

The message may include a power down command when the first monitoring unit is in proximity to the second monitoring unit and the message may include a power up command when the first monitoring unit is not in proximity to the second monitoring unit.

In accordance with another aspect of the invention, there is provided an apparatus for switching monitoring units in an electronic location monitoring system comprising a mobile transmitter operable to transmit to at least one of first and second monitoring units operable to process signals received from the mobile transmitter and transmit processed signals to a monitoring station. The apparatus includes a detector operable to produce a proximity signal indicating proximity of the first monitoring unit relative to the second monitoring unit and a first transmitter operable to cause the proximity signal to be communicated to the first monitoring unit such that, when the proximity signal indicates the first monitoring unit is in proximity to the second monitoring unit the first monitoring unit enters a low power mode in which signals are not received from the mobile transmitter by the first monitoring unit and when the proximity signal indicates that the first monitoring unit is not in proximity to the second monitoring unit the first monitoring unit enters a receive mode in which signals from the mobile transmitter are received and processed by the first monitoring unit. The apparatus further includes a second transmitter operable to cause the proximity signal to be transmitted to the second monitoring unit such that in response to the proximity signal the second monitoring unit receives and processes signals from the mobile transmitter when the proximity signal indicates the first monitoring unit is in proximity to the second monitoring unit and ceases receiving signals from the mobile transmitter when the proximity signal indicates the first monitoring unit is not in proximity to the second monitoring unit.

The detector may be operable to cause the proximity signal to indicate the first monitoring unit is in proximity to the second monitoring unit when the first monitoring unit is coupled to a docking station.

The detector may be operable to cause the proximity signal to indicate the first monitoring unit is not in proximity to the second monitoring unit when the first monitoring unit is uncoupled from a docking station.

The detector may comprise a signal strength detector operable to detect signal strength of signals received from the mobile transmitter, and the detector may produce the proximity signal in response to measured signal strength.

The detector may cause the proximity signal to indicate the first monitoring unit is in proximity to the second monitoring unit when measured signal strength meets a first signal strength criterion.

The detector may determine the first signal strength criterion is met when the measured signal strength is above a first signal strength threshold value.

The detector may cause the proximity signal to indicate the first monitoring unit is not in proximity to the second monitoring unit when measured signal strength meets a second signal strength criterion.

The detector may determine the second signal strength criterion is met when the measured signal strength is below a second signal strength threshold value.

The first and second signal strength threshold values may be the same.

The detector may include a position signal receiver operable to receive position signals representing a geographical position of the first monitoring unit, and the detector may produce the proximity signal in response to the position signals.

The detector may cause the proximity signal to indicate the first monitoring unit is in proximity to the second monitoring unit when the position signals meet a first position criterion.

The detector may determine the first position criterion is met when the position signals indicate the first monitoring unit is within a first range of a reference position.

The detector may cause the proximity signal to indicate the first monitoring unit is not in proximity to the second monitoring unit when the position signals meet a second position criterion.

The detector may determine the second position criterion is met when the position signals indicate the first monitoring unit is within a second range of the reference position.

The reference position may represent an approximate geographical position of the second monitoring unit.

The first transmitter may be operable to transmit a message representing the proximity signal to the first monitoring unit.

The apparatus may further include a first messaging service interface operable to transmit a message to the first monitoring unit through a messaging service.

The first messaging service interface may be operable to transmit a message compatible with the SMS message format or the GPRS/CDMA 1X, CDPD, Mobitex, or 1XRTT data packet format, or any other suitable format to be transmitted to the first monitoring unit.

The second transmitter may be operable to transmit a message representing the proximity signal to the second monitoring unit.

The apparatus may further include a second messaging service interface operable to transmit a message to the second monitoring unit through a messaging service.

The second messaging service interface may be operable to transmit a message compatible with the SMS message format or the GPRS/CDMA 1X, CDPD, Mobitex, or 1XRTT data packet format, or any other suitable format to be transmitted to the second monitoring unit.

The apparatus may further include a modular battery unit, operable to power the first monitoring unit. The detector, the first transmitter and the second transmitter may be incorporated into the modular battery unit.

The apparatus may further include a housing and the detector, the first transmitter, the second transmitter and the second monitoring unit may be housed in the housing.

The housing may have a docking station to facilitate docking of the first monitoring unit.

In accordance with another aspect of the invention, there is provided an apparatus for use in an electronic location monitoring system. The apparatus includes a first monitoring unit comprising a first receiver operable to receive signals from a mobile transmitter on a person to be monitored, the first receiver having a low power mode in which signals are not received from the mobile transmitter and a receive mode in which signals from the mobile transmitter are received. The first monitoring unit further includes a processor circuit for processing signals received by the first receiver to produce processed signals and a transmitter operable to transmit the processed signals to a monitoring station. The apparatus further includes a signaling unit comprising a detector operable to produce a proximity signal indicating proximity of the first monitoring unit relative to a second monitoring unit operable to receive, process and transmit signals to the monitoring station, the first receiver being responsive to the proximity signal such that, when the proximity signal indicates the first monitoring unit is in proximity to the second monitoring unit the first receiver is placed in the low power mode and when the proximity signal indicates that the first monitoring unit is not in proximity to the second monitoring unit the first receiver enters the receive mode. The signaling unit further includes a proximity signal transmitter operable to cause the proximity signal to be transmitted to the second monitoring unit, whereby in response to the proximity signal the second monitoring unit receives and processes signals from the mobile transmitter when the proximity signal indicates the first monitoring unit is in proximity to the second monitoring unit and ceases receiving signals from the mobile transmitter when the proximity signal indicates the first monitoring unit is not in proximity to the second monitoring unit. The first monitoring unit receives and processes signals from the mobile transmitter and the second monitoring unit does not receive and process signals from the mobile transmitter when the first monitoring unit is not in proximity to the second monitoring unit and the second monitoring unit receives and processes signals from the mobile transmitter and the first monitoring unit does not receive and process signals from the mobile transmitter when the first monitoring unit is in proximity to the second monitoring unit.

The apparatus may further include a modular battery unit operable to power the first monitoring unit and the signaling unit and wherein the first monitoring unit and the signaling unit may be housed in the modular battery unit.

The apparatus may further include a portable wireless communication appliance. The apparatus may be incorporated into the portable wireless communication appliance.

The portable wireless communication appliance may include a cellular telephone.

The detector may be operable to cause the proximity signal to indicate the first monitoring unit is in proximity to the second monitoring unit when the first monitoring unit is coupled to a docking station.

The detector may be operable to cause the proximity signal to indicate the first monitoring unit is not in proximity to the second monitoring unit when the first monitoring unit is uncoupled from a docking station.

The detector may comprise a signal strength detector operable to detect signal strength of signals received from the mobile transmitter, and the detector may produce the proximity signal in response to measured signal strength.

The detector may cause the proximity signal to indicate the first monitoring unit is in proximity to the second monitoring unit when measured signal strength meets a first signal strength criterion.

The detector may determine the first signal strength criterion is met when the measured signal strength is above a first signal strength threshold value.

The detector may cause the proximity signal to indicate the first monitoring unit is not in proximity to the second monitoring unit when measured signal strength meets a second signal strength criterion.

The detector may determine the second signal strength criterion is met when the measured signal strength is below a second signal strength threshold value.

The first and second signal strength threshold values may be the same.

The detector may comprise a position signal receiver operable to receive position signals representing a geographical position of the first monitoring unit and the detector may produce the proximity signal in response to the position signals.

The detector may cause the proximity signal to indicate the first monitoring unit is in proximity to the second monitoring unit when the position signals meet a first position criterion.

The detector may determine the first position criterion is met when the position signals indicate the first monitoring unit is within a first range of a reference position.

The detector may cause the proximity signal to indicate the first monitoring unit is not in proximity to the second monitoring unit when the position signals meet a second position criterion.

The detector may determine the second position criterion is met when the position signals indicate the first monitoring unit is within a second range of the reference position.

The reference position may represent an approximate geographical position of the second monitoring unit.

The proximity signal transmitter may be operable to transmit a message representing the proximity signal to the second monitoring unit.

The apparatus may further include a messaging service interface operable to transmit a message to the second monitoring unit through a messaging service.

The messaging service interface may be operable to transmit a message compatible with the SMS message format or the GPRS/CDMA 1X, CDPD, Mobitex, or 1XRTT data packet format, or any other suitable format to be transmitted to the second monitoring unit.

In accordance with another aspect of the invention, there is provided a docking apparatus for a first monitoring unit in an electronic location monitoring system in which the first monitoring unit has a first receiver operable to receive signals from a mobile transmitter on a person to be monitored and wherein the first monitoring unit is operable to process the signals to produce processed signals and to transmit the processed signals to a monitoring station. The docking apparatus comprises a second monitoring unit comprising a second receiver operable to receive signals from the mobile transmitter, the second receiver having a non-receive mode in which signals are not received from the mobile transmitter and a receive mode in which signals from the mobile transmitter are received. The second monitoring unit includes a processor circuit for processing signals received by the second receiver to produce processed signals and a transmitter operable to transmit the processed signals to the monitoring station. The docking apparatus further includes a signaling unit comprising a detector operable to produce a proximity signal indicating proximity of the first monitoring unit relative to the second monitoring unit, the second receiver being responsive to the proximity signal such that, when the proximity signal indicates the first monitoring unit is in proximity to the second monitoring unit the second receiver is placed in the receive mode and when the proximity signal indicates that the first monitoring unit is not in proximity to the second receiver unit is placed in the non-receive mode. The signaling unit further includes a proximity signal transmitter operable to cause the proximity signal to be transmitted to the first monitoring unit, whereby in response to the proximity signal the first monitoring unit receives and processes signals from the mobile transmitter when the proximity signal indicates the first monitoring unit is not in proximity to the second monitoring unit and ceases receiving signals from the mobile transmitter when the proximity signal indicates the first monitoring unit is in proximity to the second monitoring unit. The first monitoring unit receives and processes signals from the mobile transmitter and the second monitoring unit does not receive and process signals from the mobile transmitter when the first monitoring unit is not in proximity to the second monitoring unit and the second monitoring unit receives and processes signals from the mobile transmitter and the first monitoring unit does not receive and process signals from the mobile transmitter when the first monitoring unit is in proximity to the second monitoring unit.

The docking station apparatus may include a docking port to which the first monitoring unit may be coupled.

The detector may be operable to cause the proximity signal to indicate the first monitoring unit is in proximity to the second monitoring unit when the first monitoring unit is coupled to the docking station.

The detector may be operable to cause the proximity signal to indicate the first monitoring unit is not in proximity to the second monitoring unit when the first monitoring unit is uncoupled from the docking station.

The detector may comprise a signal strength detector operable to detect signal strength of signals received from the mobile transmitter and the detector may produce the proximity signal in response to measured signal strength.

The detector may cause the proximity signal to indicate the first monitoring unit is in proximity to the second monitoring unit when measured signal strength meets a first signal strength criterion.

The detector may determine the first signal strength criterion is met when the measured signal strength is above a first signal strength threshold value.

The detector may cause the proximity signal to indicate the first monitoring unit is not in proximity to the second monitoring unit when measured signal strength meets a second signal strength criterion.

The detector may determine the second signal strength criterion is met when the measured signal strength is below a second signal strength threshold value.

The first and second signal strength threshold values may be the same.

The detector may comprise a position signal receiver operable to receive position signals representing a geographical position of the first monitoring unit and the detector may produce the proximity signal in response to the position signals.

The detector may cause the proximity signal to indicate the first monitoring unit is in proximity to the second monitoring unit when the position signals meet a first position criterion.

The detector may determine the first position criterion is met when the position signals indicate the first monitoring unit is within a first range of a reference position.

The detector may cause the proximity signal to indicate the first monitoring unit is not in proximity to the second monitoring unit when the position signals meet a second position criterion.

The detector may determine the second position criterion is met when the position signals indicate the first monitoring unit is within a second range of the reference position.

The reference position may represent an approximate geographical position of the second monitoring unit.

The first transmitter may be operable to transmit a message representing the proximity signal to the first monitoring unit.

The apparatus may further include a messaging service interface operable to transmit a message to the first monitoring unit through a messaging service.

The messaging service interface may be operable to transmit a message compatible with the SMS message format or the GPRS/CDMA 1X, CDPD, Mobitex, or 1XRTT data packet format, or any other suitable format to be transmitted to the first monitoring unit.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
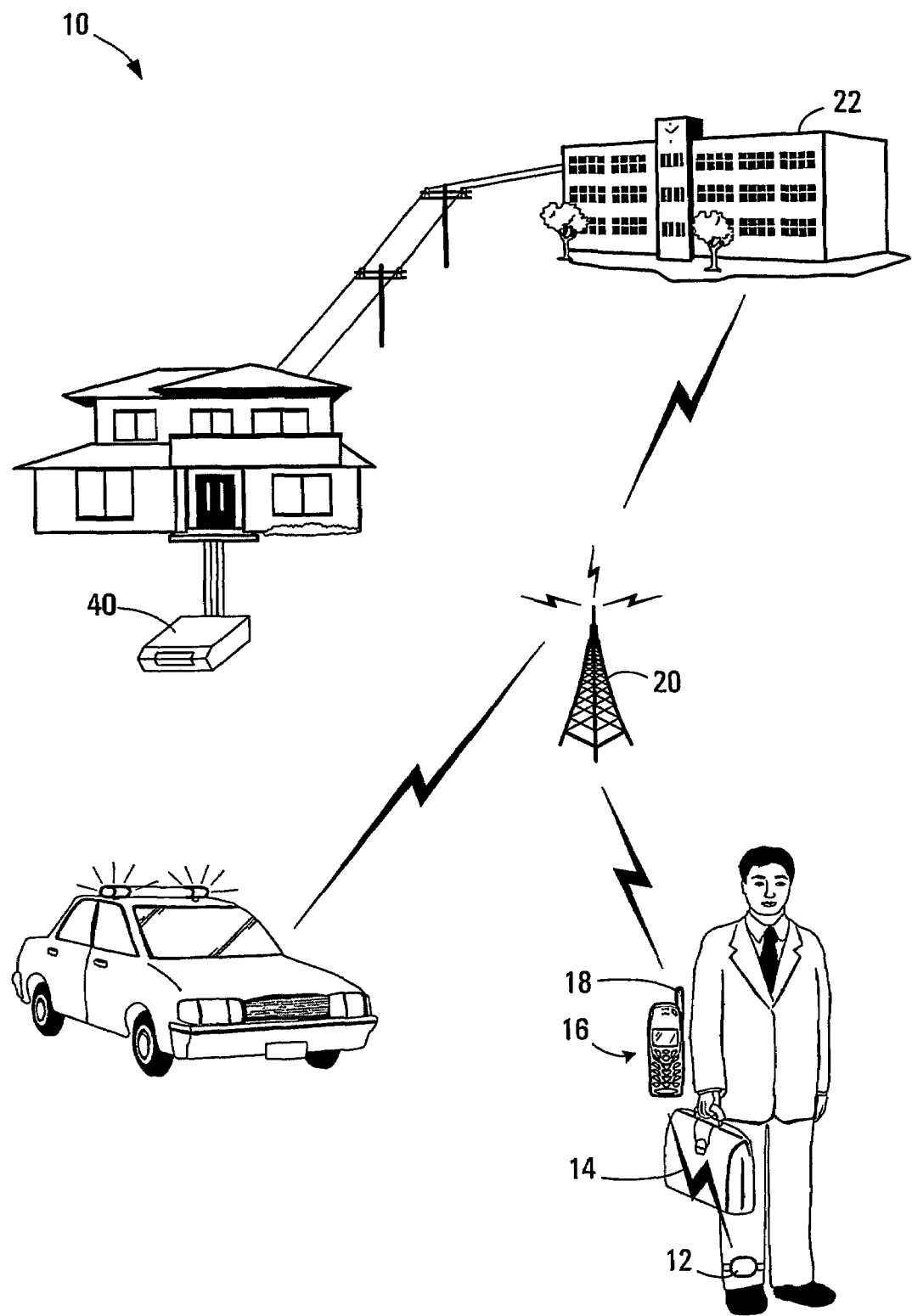
FIG. 1 is a schematic diagram of an electronic location monitoring system according to a first embodiment of the invention.

Referring to FIG. 1, an electronic location monitoring system according to a first embodiment of the invention is shown generally at 10. The system includes a mobile transmitter 12 which may be strapped onto an incarcerated person by nonremovable bands, a strap, or other permanent securing means. The mobile transmitter may incorporate tamper detection mechanisms that, where a strap is used, may detect severing of a strap, or a change in the resistance of a strap circuit, caused by attempting to electrically jumper it. The mobile transmitter may be housed in a waterproof casing and may also include tamper detection circuitry, which may include detection of case tampering or proximity to skin, for example.

The mobile transmitter 12 periodically transmits a beacon signal 14 encoded with information that may include a transmitter identification code, battery status code, tamper status code and/or other information. The beacon signal 14 may be transmitted periodically at a frequency of about 433 MHz, for example, but any radio frequency may be used. Furthermore, the mobile transmitter 12 may communicate with the receiver on multiple communication channels, so that if one channel experiences interference, the other communication channel may still be functional. The mobile transmitter 12 need only transmit the beacon signal 14 at a power level sufficient to permit the signal to be detected a short distance away. A power level sufficient to permit the beacon signal 14 to be detected about 300 feet away is sufficient.

Figure 2:
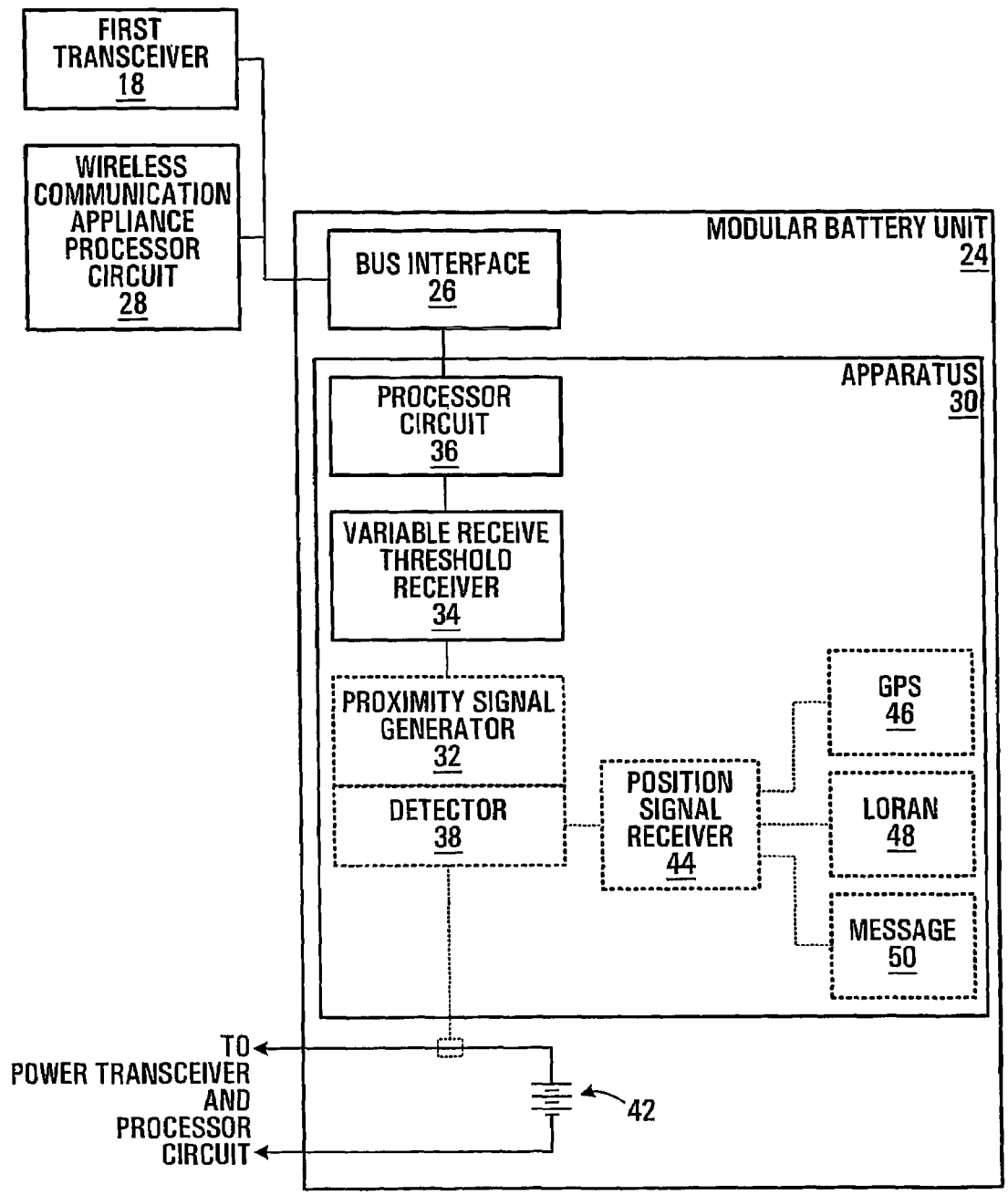
FIG. 2 is a block diagram of a wireless communication appliance according to a first embodiment of the invention.

In the embodiment shown, the system 10 further includes a wireless communication appliance 16, which may include a wireless telephone, for example. Referring to FIG. 2, the wireless communication appliance 16 includes a first transceiver 18 operable to receive from and transmit signals to a base station 20 shown in FIG. 1 of a public communications network such as a cellular telephone network, for communication to a monitoring station 22 via the same network or the public switched telephone network.

Referring back to FIG. 2, in the embodiment shown, the wireless communication appliance 16 is powered by a removable modular battery unit 24 having a bus interface 26 that allows it to communicate with a processor circuit 28 of the wireless communication appliance. According to an aspect of the invention, a monitoring unit apparatus 30 operable to receive signals from the mobile transmitter 12 shown in FIG. 1 is included within the modular battery unit 24 and is operable to communicate with the processor circuit 28 of the wireless communication appliance 16 through the bus interface 26. Alternatively, the apparatus 30 may be incorporated as a functional block of the wireless communication appliance 16, for example.

In the embodiment shown, the apparatus 30 includes a proximity signal generator 32 operable to generate a proximity signal in response to proximity of the monitoring unit apparatus 30 relative to a reference position, a receiver 34 operable to receive signals from the mobile transmitter (12), and a processor circuit 36 operable to process signals received by the receiver to produce processed signals for communication to the monitoring station. The processor circuit 36 is operable to communicate with the first transceiver 18 of the wireless communication appliance 16 through the bus interface 26 and the processor circuit 28 of the wireless communication appliance to cause the first transceiver 18 to transmit the processed signals to the monitoring station 22 shown in FIG. 1.

Of particular importance to the monitoring unit apparatus 30 is the receiver 34 as it is specially configured to have a signal reception threshold responsive to the proximity signal, such that the receiver rejects signals from the mobile transmitter (12) that have a signal strength below the signal reception threshold and receives signals from the mobile transmitter that have a signal strength above the signal reception threshold. In general, the receiver 34 is operable to decrease the signal reception threshold (i.e., increase sensitivity) when the proximity signal indicates the monitoring unit apparatus 30 is in proximity to the reference position and to increase the signal reception threshold (i.e., decrease sensitivity) when the proximity signal indicates monitoring unit apparatus 30 is not in proximity to the reference position.

The proximity signal generator 32 includes a detector 38 operable to detect proximity of the monitoring unit apparatus 30 to the reference position. Various types of detectors may be employed for this purpose. For example, in one embodiment the detector 38 is operable to detect coupling of the wireless communication appliance 16 to a docking station 40 such as shown in FIG. 1, and to cause the proximity signal to indicate the monitoring unit apparatus 30 is in proximity to the reference position when the wireless communication appliance 16 is coupled to the docking station. The position of the docking station is thus the reference position. Similarly, the detector 38 is operable to detect uncoupling of the wireless communication appliance from the docking station 40 and to cause the proximity signal to indicate the monitoring unit apparatus 30 is not in proximity to the reference position when the wireless communication appliance 16 is uncoupled from the docking station.

Coupling to the docking station 40 may involve receiving the wireless communication appliance 16 in a receptacle of the docking station, plugging the wireless communication appliance into a pigtail connector of the docking station, or engaging a wireless link such as a Bluetooth® link, or infrared link between the docking station and the mobile wireless communication appliance, for example.

A detector operable to detect coupling and uncoupling may be implemented by causing the processor circuit 36 in the apparatus to communicate through the bus interface 26 with the processor circuit 28 of the wireless communication appliance 16 to receive a signal indicating that the communication appliance has been docked in a docking station compatible with the communication appliance. The processor circuit 28 in the wireless communication appliance may detect whether the wireless communication appliance 16 is placed in the docking station. A modification may be made to a program controlling the processor circuit 28 in the wireless communication appliance 16 to cause it to set a flag at a port accessible through the bus interface 26 and readable by the processor circuit 36 of the apparatus 30, depending upon whether the wireless communication appliance 16 is or is not in the docking station (40). The flag itself may act as the proximity signal, in which case the processor circuit 28 of the wireless communication appliance 16 may be considered to act as at least a portion of the proximity signal generator 32.

Alternatively, especially where the docking station 40 is configured to charge the battery unit when the communication appliance is in the docking station 40, the detector 38 may be configured to monitor signals applied to a battery 42 thereof and detect the direction of current flow relative to the battery whereby the proximity signal is set active to indicate proximity of the monitoring unit apparatus 30 to the reference position when the current flow is into the battery and is set inactive to indicate the wireless communication appliance is out of proximity with the reference position, when the current flow is out of the battery. In this embodiment, the reference position corresponds to the position of the docking station (40).

In another embodiment, the detector 38 may include a position signal receiver 44 operable to receive position signals representing a geographical position of the wireless communication appliance 16 and hence the monitoring unit apparatus 30 and the proximity signal generator 32 produces the proximity signal in response to the position signals. The position signal receiver 44 may be of a type that comprises a global positioning system (GPS) signal receiver 46, or a Long Range Radio Navigation (LORAN) receiver 48, for example. The position signals produced by the position signal receiver may include all or a subset of the following data items, for example: latitude, longitude, altitude, horizontal velocity, vertical velocity, heading, and a measure of precision of the location fix. The position information may be time-stamped and data logged along with the mobile transmitter 12 status data in a data log. The date and time used to time-stamp the data may be obtained from the GPS receiver or the wireless telecommunication network, or even possibly via messages from the central monitoring center computer that the wireless communication appliance reports to. These messages may include a message compatible with the SMS message format or the GPRS/CDMA 1X, CDPD, Mobitex, or 1XRTT data packet format, or any other suitable format, for example.

Alternatively, the position signal receiver may include the processor circuit 36 of the apparatus 30, which may communicate with the processor circuit 28 of the wireless communication appliance 16 to cause the first receiver to receive position signals provided by the wireless communication network. Such signals may be produced by the wireless communication network in response to triangulation techniques involving a plurality base stations (20) in communication with the wireless communication appliance 16, for example, as is known in the art. In such an embodiment, the position signal receiver 44 may be considered to include the first transceiver 18 of the wireless communication appliance. In one embodiment, the position signal receiver 44 may include a message receiver 50 operable to receive messages from a messaging system, the messages including data representing position signals specifying the geographical position of the monitoring unit apparatus 30. Effectively, the position signal produced by the wireless network by triangulation, may be formatted in a message compatible with the SMS message format or the GPRS/CDMA 1X, CDPD, Mobitex, or 1XRTT data packet format, or any other suitable format, for example, and sent to the wireless communication appliance, where position information may be extracted from the messages by the processor circuit 28 of the wireless communication appliance or the processor circuit 36 of the apparatus 30.

In embodiments employing the position signal receiver 44, regardless of how the position signals are received at the apparatus, the detector 38 is operable to cause the proximity signal to indicate the monitoring unit apparatus 30 is in proximity to the reference position when the position signals meet a first position criterion. The detector 38 may be implemented by the processor circuit 28 of the wireless communication appliance 16 or by the processor circuit 36 of the apparatus 30, or by parts of these circuits or by both. The detector 38 may be configured to determine the first position criterion is met when the position signals indicate the monitoring unit apparatus 30 is within a first range of the reference position. For example, the detector 38 may be configured to cause the proximity signal to indicate the monitoring unit apparatus 30 is in proximity to the reference position when the position signals indicate the first receiver is within 300 feet (100 m) of the reference position. The reference position may correspond to the geographical position of the home, school or workplace of the incarcerated individual, for example.

Similarly, the detector 38 may be operable to cause the proximity signal to indicate the monitoring unit apparatus 30 is not in proximity to the reference position when the position signals meet a second position criterion and the detector may be configured to determine the second position criterion is met when the position signals indicate the monitoring unit apparatus 30 is within a second range of the reference position. For example, the detector 38 may be configured to cause the proximity signal to indicate the monitoring unit apparatus 30 is not in proximity to the reference position when the position signals indicate the apparatus is more than 300 feet (100 m) from the reference position.

When the monitoring unit apparatus 30 is not in proximity to the reference position, as indicated by the proximity signal, in response to the proximity signal, the receiver 34 maintains the receive threshold at a relatively high value. The receive threshold can be held at a relatively high value because it is expected that the incarcerated individual will carry the wireless communication appliance with him/her while away from his/her home or workplace, where the docking station 40 may be kept, for example. Since the incarcerated individual wears the mobile transmitter 12 and the wireless communication appliance 16 is carried by the incarcerated individual when away from the docking station 40, the mobile transmitter and the receiver 34 of the apparatus 30 are relatively close to each other and thus, the receiver need not be ultra sensitive to the beacon signal.

When the monitoring unit apparatus 30 is in proximity to the reference position, as indicated by the proximity signal, in response to the proximity signal, the receiver 34 decreases its receive threshold to a relatively low value. If the reference position is the geographical location of the docking station, for example, the receive threshold is decreased when the wireless communication appliance is in the docking station 40 in the home, school or workplace. The decrease in receive threshold permits the incarcerated individual wearing the mobile transmitter 12 to move freely within a radius of the docking station 40 without having to carry the wireless communication appliance 16. The wireless communication appliance 16 is thus less obtrusive.

Regardless of the level of the receive threshold, beacon signals having a signal strength above the receive threshold are received and processed by the processor circuit 36 to extract the information pertaining to the identification, tamper status and battery level. Such processing may involve time-stamping a received beacon signal and storing it for producing signals for transmission to the monitoring station 22 through the first transceiver 18 of the wireless communication appliance 16. In addition, a representation of the proximity signal may be included in the signals transmitted to the monitoring station 22. The signals transmitted to the monitoring station 22 may include signals representing a message such as a message compatible with the SMS message format or the GPRS/CDMA 1X, CDPD, Mobitex, or 1XRTT data packet format, or any other suitable format, for example. The monitoring station is thus informed of the status of the mobile transmitter 12.

When the monitoring unit apparatus 30 is not in proximity to the reference position, the receiver 34 may listen for transmissions from the mobile transmitter 12 having a signal strength associated with a range of about 10-20 feet. When the monitoring unit apparatus 30 is in proximity to the reference position, the receiver 34 may listen for transmissions from the mobile transmitter 12 having a signal strength associated with a range of about 300 feet.

Regardless of the range, if the receiver 34 does not receive any transmission from the mobile transmitter 12 within a specified duration, it may assume that the mobile transmitter 12 (and hence the individual wearing the transmitter device) is not at the location of the wireless handset. The processing by the processor circuit 36 may involve keeping track of the current status, i.e., whether the apparatus 30 is within the specified range of the mobile transmitter 12 in an internal data log.

The position information as well as status information regarding the mobile transmitter 12 identification may be transmitted to the monitoring station 22 using the wireless telecommunications network. The position information and status information may be transmitted continuously at specified intervals, or alternatively, the processor circuit 36 may periodically store the position information in internal data memory, and periodically send all location stored points at one time to the monitoring station 22.

Similarly, it may also be possible for the monitoring station 22 to use messaging to query the apparatus 30 for its current location as well as the status of its matched mobile transmitter 12. An authorized user may also make such a query by messaging with a suitable wireless communication device from any place that allows wireless communication to be established. In addition to querying the current location and status from the wireless handset device, position and mobile transmitter status data logged in the internal memory of the apparatus may be selectively downloaded by messaging.

The monitoring station may also send messages to the apparatus to cause it to alter its receiver sensitivity, set criteria for determining position conditions, configure the receiver 34 for use with different mobile transmitters 12, configure time intervals for transmissions to the monitoring station, download alarm events, receive alert or warning messages for annunciation to the incarcerated individual, and perform other functions as may be required. Such messages may include a message compatible with the SMS message format or the GPRS/CDMA 1X, CDPD, Mobitex, or 1XRTT data packet format, or any other suitable format, for example.

It will be appreciated that the apparatus 30 may include a receiver 34 operable to receive different beacon signals from a plurality of different mobile transmitters 12, on a plurality of different channels and that the channels may be scanned, for example for active beacon signals: Each signal received on each channel may be provided to the processor circuit 36 by multiplexing, for example to consider each signal separately. This allows a single wireless communication appliance to be used to simultaneously monitor a plurality of incarcerated individuals.

Figure 3:
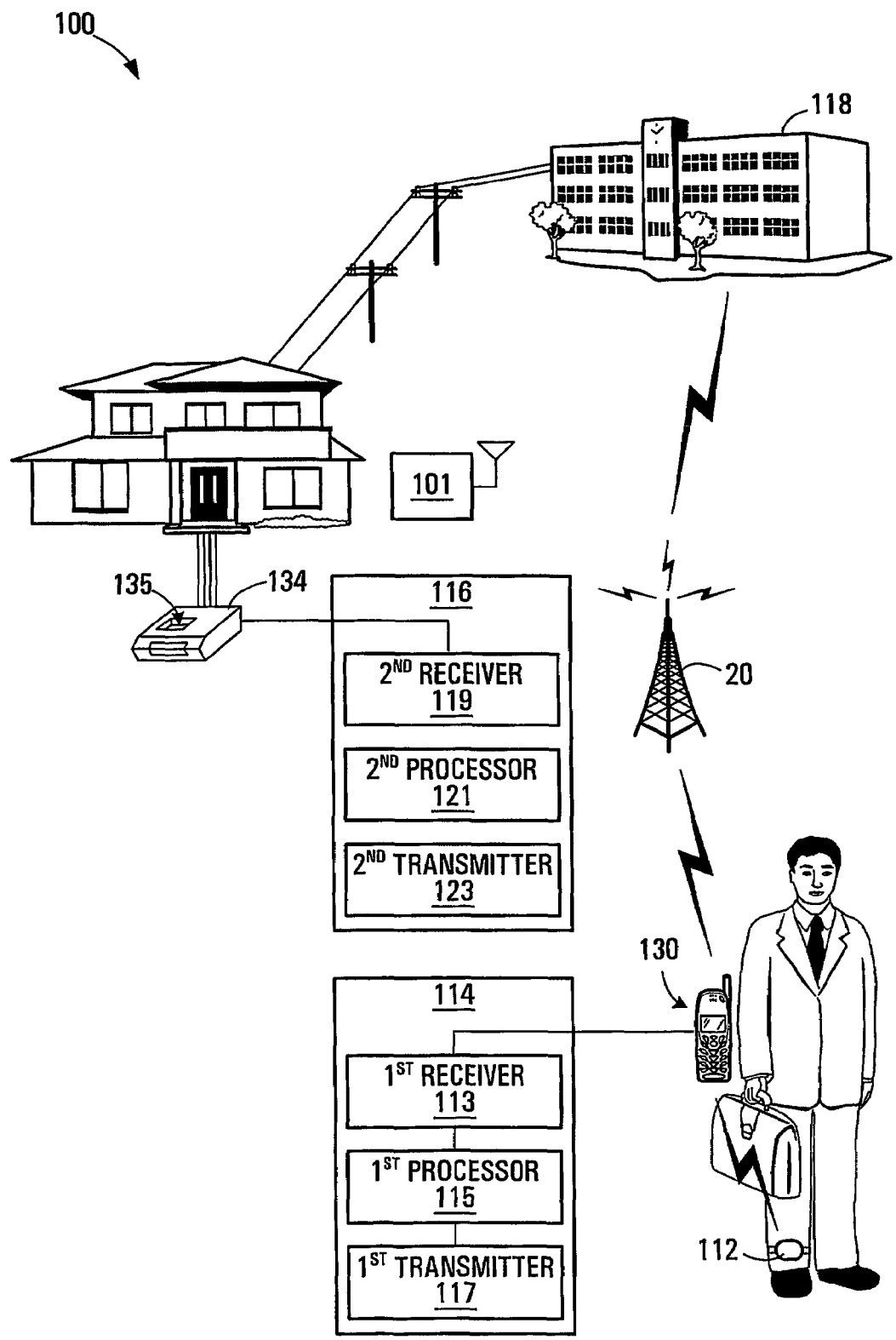
FIG. 3 is a schematic diagram of an electronic location monitoring system according to a second embodiment of the invention.

Referring to FIG. 3, a signaling apparatus facilitating switching of monitoring units in an electronic location monitoring system 100 comprising a mobile transmitter 112 operable to transmit to at least one of first and second monitoring units 114 and 116 operable to communicate with a monitoring station 118 is shown generally at 101.

The first monitoring unit 114 includes a first receiver 113 (or transceiver) operable to receive signals from the mobile transmitter 112. The first receiver 113 has a low power mode in which signals are not received from the mobile transmitter 112 and a receive mode in which signals are received from the mobile transmitter. The first monitoring unit 114 further includes a processor circuit 115 for processing signals received by the first receiver 113 to produce processed signals and includes a transmitter 117 (or transceiver) operable to transmit processed signals to the monitoring station 118. The first monitoring unit may be included within a wireless communication appliance 130, for example.

The second monitoring unit 116 includes a second receiver 119 (or transceiver) operable to receive signals from the mobile transmitter 112. The second receiver 119 has a non-receive mode in which signals are not received from the mobile transmitter 112 and a receive mode in which signals are received from the mobile transmitter 112. The second monitoring unit 116 further includes a processor circuit 121 for processing signals received by the second receiver 119 to produce processed signals and includes a transmitter 123 operable to transmit processed signals to the monitoring station 118.

The first and second monitoring units 114 and 116 may both be mobile, but it is contemplated that the first monitoring unit 114 will be part of a mobile wireless communication appliance 130 carried on or by the incarcerated individual and thus the beacon signal produced by the mobile transmitter 112 which is worn by the individual is indicative of the presence of the first monitoring unit. This physical relationship is exploited as described below. The processor circuit 115 of the first monitoring unit is in communication with a processor of the mobile wireless communication appliance which in turn is in communication with a wireless transceiver thereof so that the processor can communicate with the monitoring station and other devices, such as the signaling apparatus 101. Thus, the wireless transceiver of the mobile wireless communication appliance itself may act as the transmitter 117 of the first monitoring unit 114.

The second monitoring unit 116 may be part of a stationary communication appliance 132 and the processor circuit 121 and transmitter 123 thereof may be operable to communicate with the monitoring station 118 and other devices such as the signaling apparatus 101 by a landline or may include a transceiver (not shown) to facilitate communications with the monitoring station and other devices such as the signaling apparatus 101 by wireless methods.

The second monitoring unit 116 may be geographically located near a docking station 134 or may be part of a docking station operable to recharge the mobile wireless communication appliance, as will be described in further detail below.

Figure 4:
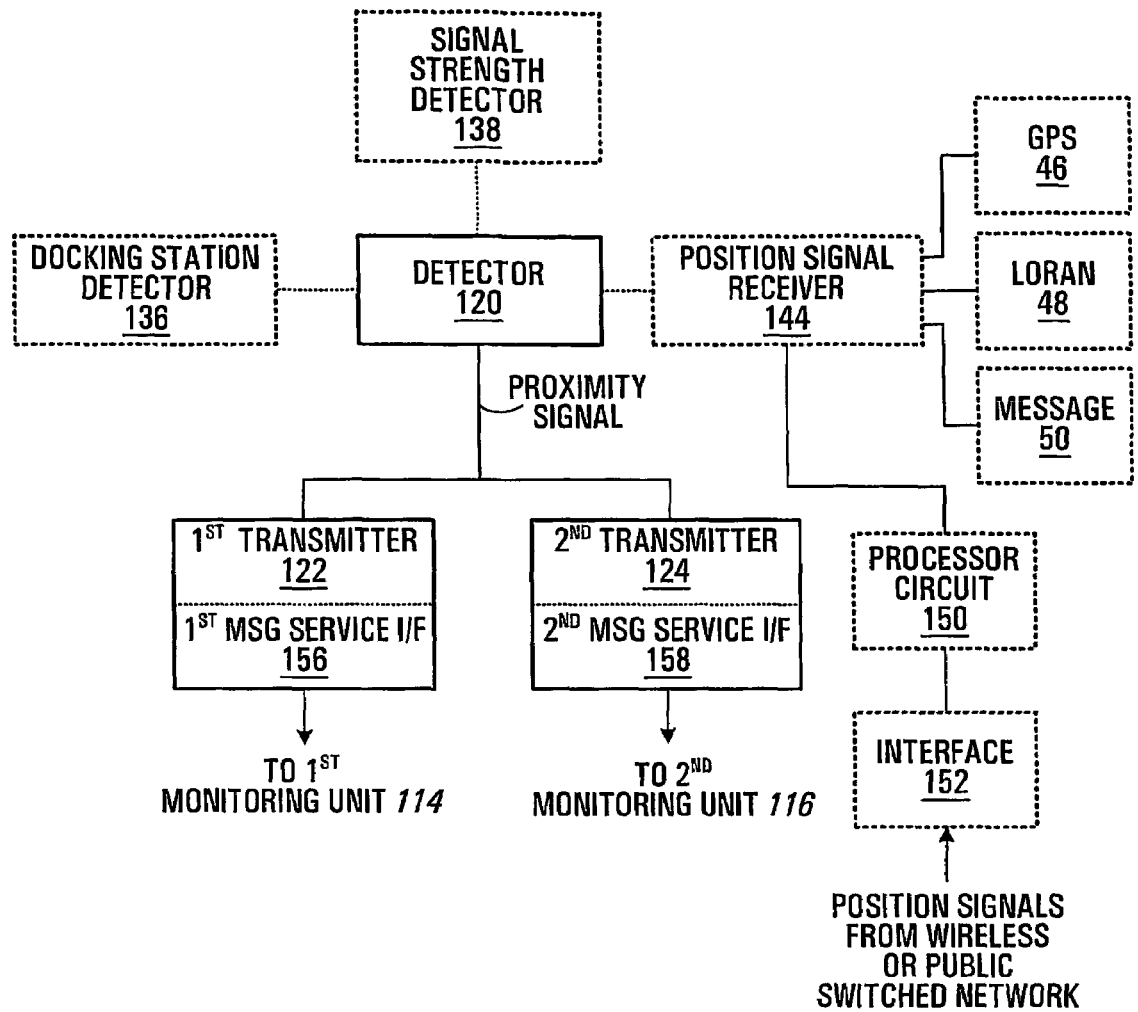
FIG. 4 is a block diagram of a signaling apparatus shown in FIG. 3.

Referring to FIGS. 3 and 4, the signaling apparatus 101 includes a detector 120 operable to produce a proximity signal indicating proximity of the first monitoring unit 114 relative to the second monitoring unit 116 and includes first and second transmitters 122 and 124. The first transmitter 122 is operable to cause the proximity signal to be communicated to the first monitoring unit (114) and the processor circuit 115 of the first monitoring unit is configured such that, when the proximity signal indicates the first monitoring unit is in proximity to the second monitoring unit 116 the first receiver 113 of the first monitoring unit is put into a low power mode in which signals are not received from the mobile transmitter 112. In general, the entire first monitoring unit may be placed in a low power mode.

When the proximity signal indicates that the first monitoring unit 114 is not in proximity to the second monitoring unit 116 the first receiver 113 and more generally the entire first monitoring unit, is set into a receive mode so that signals from the mobile transmitter 112 are received and processed by the first monitoring unit.

The second transmitter 124 is operable to cause the proximity signal to be transmitted to the second monitoring unit 116 and the processor circuit 121 of the second monitoring unit is configured such that in response to the proximity signal, the second monitoring unit receives and processes signals from the mobile transmitter 112 when the proximity signal indicates the first monitoring unit 114 is in proximity to the second monitoring unit and ceases receiving signals from the mobile transmitter when the proximity signal indicates the first monitoring unit is not in proximity to the second monitoring unit. Ceasing reception of signals at the second monitoring unit may involve setting the second receiver 119 into a non-receive mode.

The detector (120) is configured to cause the proximity signal to indicate the first monitoring unit 114 is in proximity to the second monitoring unit 116 when the first monitoring unit is coupled to a docking port of the docking station. Coupling to the docking port of the docking station 134 may involve receiving the mobile wireless communication appliance 130 in a receptacle 135 of the docking station, plugging the mobile wireless communication appliance 130 into a pigtail connector of the docking station, or engaging a wireless link such as a Bluetooth® link, or infrared link between the docking station and the mobile wireless communication appliance. Each of these components may act as a docking port to which the first monitoring unit may be coupled.

Referring to FIGS. 3 and 4, the detector 120 is configured to produce a proximity signal to indicate the first monitoring unit 114 is not in proximity to the second monitoring unit 116 when the first monitoring unit is uncoupled from the docking station 134. Thus, when the mobile wireless communication appliance 130 is away from the docking station 134 the detector 120 causes the proximity signal to indicate same and the first transmitter 122 transmits the proximity signal to the first monitoring unit 114 causing it to actively receive signals from the mobile transmitter 112 and the second transmitter 124 transmits the proximity signal to the second monitoring unit 116 causing the second monitoring unit 116 to ignore signals from the mobile transmitter. Thus, when the first monitoring unit 114 is not in proximity to the second monitoring unit 116 the first monitoring unit 114 transmits processed signals to the monitoring station 118 while the second monitoring unit 116 does not.

When the mobile wireless communication appliance 130 is in the docking station 134 the detector 120 produces the proximity signal to indicate same and the first transmitter 122 transmits the proximity signal to the first monitoring unit 114 causing it to enter the low power mode in which it does not receive signals from the mobile transmitter 112 and the second transmitter 124 sends the proximity signal to the second monitoring unit 116 causing it to receive and process signals from the mobile transmitter 112. Thus, when the first monitoring unit 114 is not in proximity with the second monitoring unit 116, the second monitoring unit 116 transmits processed signals to the monitoring station 118 while the first monitoring unit 114 does not.

Detecting whether or not the mobile wireless communication appliance 130 is coupled to or uncoupled from the docking station 134 may be achieved using a docking station detector 136 employing the flag or battery current direction methods described above in connection with the embodiment shown in FIGS. 1 and 2, for example, or other detection methods may be employed.

As an alternative to direct detection of whether or not the mobile wireless communication appliance 130 is coupled to or uncoupled from the docking station 134, detecting proximity of first and second monitoring units 114 and 116 may be determined by measuring signal strength of the beacon signal received from the mobile transmitter 112, since the mobile transmitter 112 and the first monitoring unit are carried by the same incarcerated individual. In this embodiment, the detector 120 comprises a signal strength detector 138 operable to detect signal strength of signals received from the mobile transmitter 112 and to produce the proximity signal in response to measured signal strength.

Many off-the-shelf radio frequency receivers have outputs representing a signal strength value of a signal received and demodulated from a radio frequency source, in addition to a signal output at which a demodulated version of the radio frequency signal is produced. Such a radio frequency receiver may act as the signal strength detector 138 to produce a signal representing signal strength. The signal strength detector 138 may further include a processor circuit 140 configured to determine whether or not the signal representing signal strength meets a first signal strength criterion. The signal strength detector 138 causes the proximity signal to indicate the first monitoring unit 114 is in proximity to the second monitoring unit 116 when measured signal strength of the beacon signal from the mobile transmitter 112 meets the first signal strength criterion. The signal strength detector 138 may be configured to determine the first signal strength criterion is met when the measured signal strength is above a first signal strength threshold value.

Similarly, the signal strength detector 138 causes the proximity signal to indicate the first monitoring unit 114 is not in proximity to the second monitoring unit 116 when measured signal strength of the beacon signal meets a second signal strength criterion. The signal strength detector 138 may determine the second signal strength criterion is met when the measured signal strength is below a second signal strength threshold value. The first and second signal strength threshold values may be the same or different, or may differ over time depending on operating conditions. For example, the first and second signal strength threshold values may be set to values that create a hysteresis effect, whereby setting the proximity signal to indicate the first monitoring unit 114 is in proximity to the second monitoring unit 116 occurs at a different signal strength when measured signal strength of the beacon signal is increasing as compared to the measured signal strength of the beacon signal at which the proximity signal is set to indicate the first monitoring unit 114 is not in proximity to the second monitoring unit 116 when measured signal strength of the beacon signal is decreasing.

Thus, while the mobile wireless communication appliance 130 and hence the mobile transmitter 112 is sufficiently far away from the docking station 134 the signal strength detector 138 detects a relatively weak beacon signal or no signal from the mobile transmitter 112 and causes the proximity signal to indicate the first monitoring unit 114 is not in proximity to the second monitoring unit 116. The first monitoring unit 114 thus receives and processes signals from the mobile transmitter and transmits these signals to the monitoring station 118.

As the mobile wireless communication appliance 130 and hence the mobile transmitter 112 is brought nearer the signal strength detector 138, the beacon signal strength measured by the detector increases. When the beacon signal strength meets the first criterion, the signal strength detector 138 causes the proximity signal to indicate the first monitoring unit 114 is in proximity to the second monitoring unit 116 and the first and second transmitters 122 and 124 transmit the proximity signal indicating this to the first and second monitoring units 114 and 116 respectively. In response, the first monitoring unit 114 enters its low power mode and the second monitoring unit 116 begins receiving and processing the signals received from the mobile transmitter 112 and transmits the processed signals to the monitoring station 118. Thus, the second monitoring unit 116 "takes over" receiving and processing from the first monitoring unit 114 when the first monitoring unit is brought into proximity with the second monitoring unit.

As a further alternative to detecting the presence of the mobile wireless communication appliance in the docking station, and to measuring signal strength, the detector 120 may include a position signal receiver 144 operable to receive position signals representing a geographical position of the first monitoring unit (114), and the detector 120 produces the proximity signal in response to the position signals. The position signal receiver 144 may be of a type that comprises a global positioning system (GPS) signal receiver 146, or a Long Range Radio Navigation (LORAN) receiver 148, for example. Alternatively, the position signal receiver 144 may include a processor circuit 150, which may communicate with an interface 152 to the wireless network or public switched telephone network. The position signal receiver 144 may further include a message receiver 154 operable to receive messages from a messaging system, the messages including data representing position signals specifying the geographical position of the first monitoring unit 114. Effectively, a position signal produced by the wireless network by triangulation, may be formatted by the wireless network in a message compatible with the SMS message format or the GPRS/CDMA 1X, CDPD, Mobitex, or 1XRTT data packet format, or any other suitable format, for example.

In an embodiment employing the position signal receiver 144, regardless of how the position signals are received at the apparatus, the detector 120 is operable to cause the proximity signal to indicate the first monitoring unit 114 is in proximity to the reference position when the position signals meet a first position criterion. The detector 120 may be configured to determine the first position criterion is met when the position signals indicate the first monitoring unit 114 is within a first range of the reference position. For example, the detector 120 may be configured to cause the proximity signal to indicate the apparatus 30 is in proximity to the reference position when the position signals indicate the apparatus is within 300 feet (100 m) of the reference position. The reference position may correspond to the geographical position of the second monitoring unit 116.

Similarly, the detector 120 may be operable to cause the proximity signal to indicate the first monitoring unit 114 is not in proximity to the reference position when the position signals meet a second position criterion and the detector may be configured to determine the second position criterion is met when the position signals indicate the first monitoring unit 114 is within a second range of the reference position. For example, the detector 120 may be configured to cause the proximity signal to indicate the first monitoring unit is not in proximity to the reference position when the position signals indicate the first monitoring unit is more than 300 feet (100 m) from the reference position.

Regardless of how the proximity signal is produced, in one embodiment, the first transmitter 122 is operable to transmit a message representing the proximity signal to the first monitoring unit 114. To facilitate this, in one embodiment, the first transmitter 122 includes a messaging service interface 156 operable to transmit a message to the first monitoring unit 114 through a messaging service. The messaging service interface 156 may be operable to transmit a message compatible with the SMS message format or the GPRS/CDMA 1X, CDPD, Mobitex, or 1XRTT data packet format, or any other suitable format, for example.

Similarly, in one embodiment the second transmitter 124 may be operable to transmit a message representing the proximity signal to the second monitoring unit and the second transmitter may include a messaging service interface 158 operable to transmit a message to the second monitoring unit through a messaging service which may be the same or a different messaging service used by the first transmitter.

Figure 5:
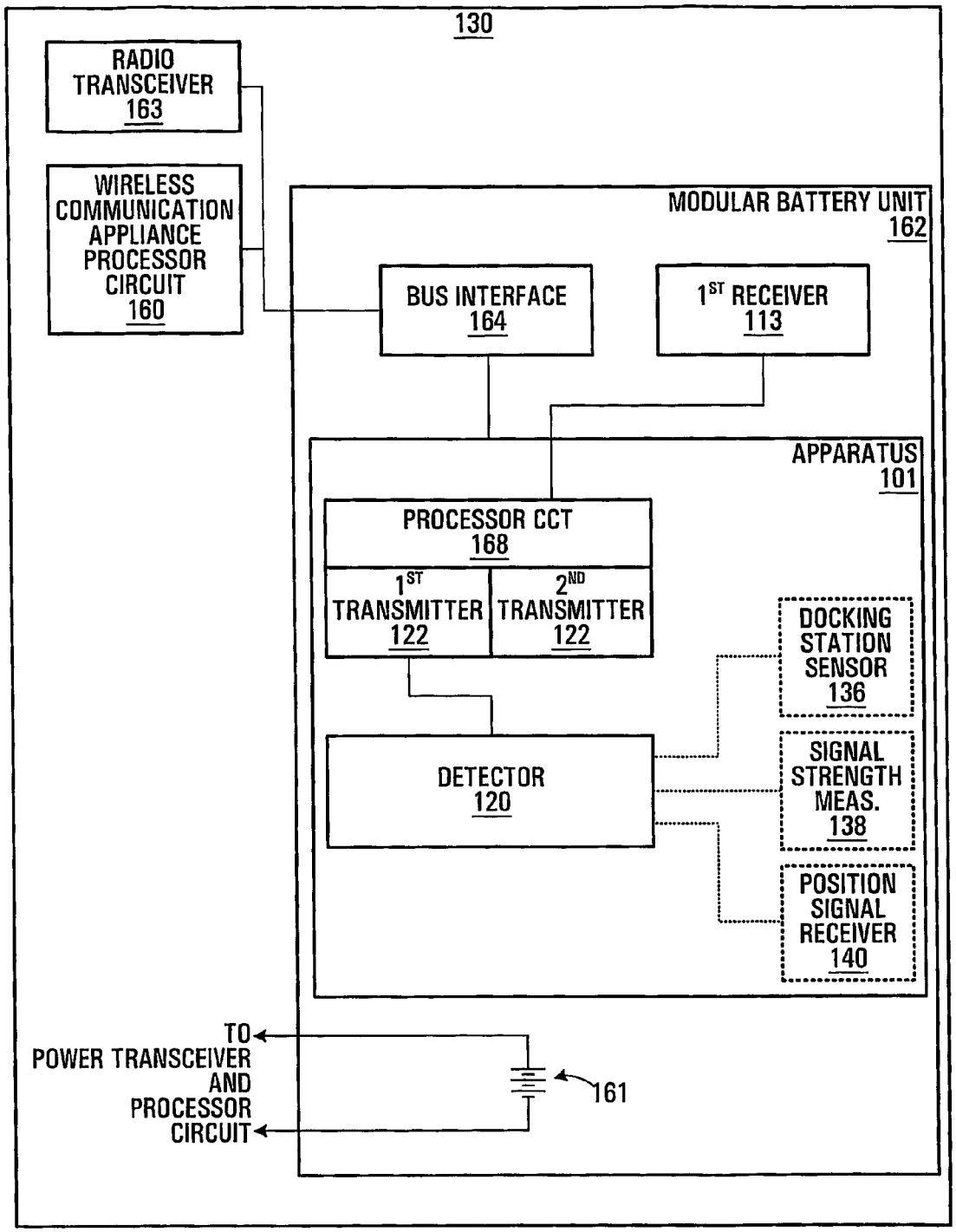
FIG. 5 is a block diagram of a mobile communication appliance incorporating a monitoring unit and the signaling apparatus of FIG. 4.

Referring to FIG. 5, in one embodiment the signaling apparatus shown in FIG. 4, and the monitoring unit 114 shown in FIG. 3 may be housed in a common housing such as a modular battery unit 162 of the mobile wireless communication appliance 130. In this embodiment, the modular battery unit 162 includes a battery 161 operable to supply power to the mobile wireless communication appliance 130 and includes a bus interface 164 in communication with a processor circuit 160 of the wireless communication appliance. The signaling apparatus 101 described above is partly implemented by a processor circuit 168 operable to implement the first and second transmitters 122 and 124 and includes the detector 120. The detector 120 may include any or a combination of the docking station detector 136, the signal strength detector 138 or the position signal receiver 144. The processor circuit 168 may implement the processor circuit 115 of the first monitoring unit 114 and may be connected to the first receiver 113 which is also housed in the modular battery unit 162. Simple modifications that would be apparent to those in the art may be made to a program controlling the wireless communication appliance processor circuit 160 to facilitate communication between the processor circuit 168 and the processor circuit 160 of the wireless communication appliance to permit a radio transceiver 163 of the wireless communication appliance to be used to transmit signals produced by the processor circuit 168 to the monitoring station 118 in response to the beacon signal.

As will be appreciated the proximity signal may be produced by a variety of methods as described above. The proximity signal is transmitted directly to the first receiver 113 to directly control it to place it in the receive mode or the low power mode, depending on the state of the proximity signal. The processor circuit 168 acting in its capacity as the second transmitter 124, also transmits a message representing the proximity signal to the wireless communication appliance processor circuit 160 which causes the radio transceiver 163 to transmit the message via any suitable messaging format such as those described above to the second monitoring unit 116 shown in FIG. 3. In response the receiver 119 of the second monitoring unit 116, is placed in a receive mode or a non-receive mode depending on the state of the proximity signal.

Figure 6:
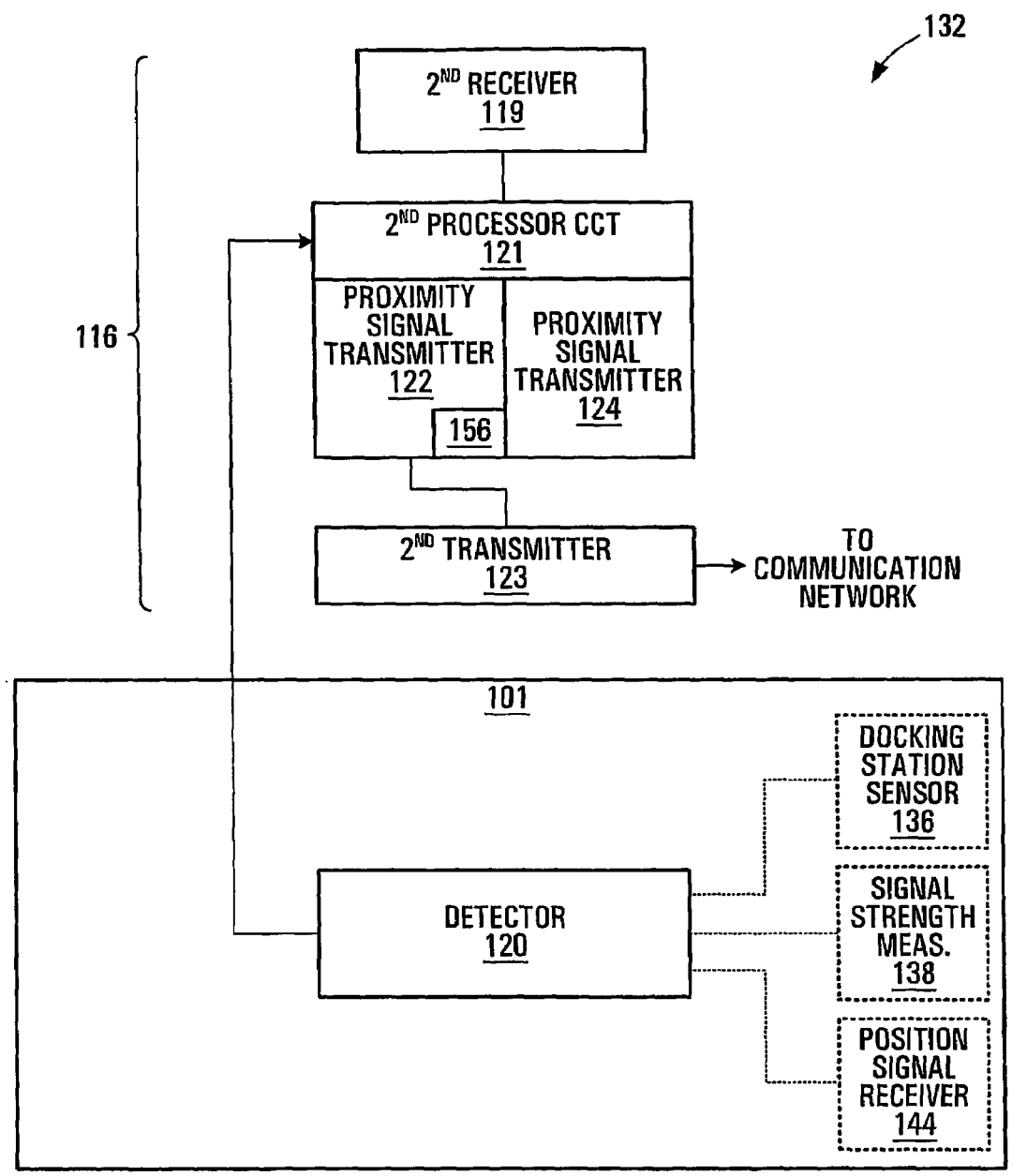
FIG. 6 is a block diagram of a stationary communication appliance incorporating a monitoring unit and the signaling apparatus of FIG. 4.

Referring to FIG. 6, in another embodiment, the signaling apparatus 101 is housed in the docking station 134, in addition to the second monitoring unit 116. The detector 120 of the signaling apparatus 101 is in communication with the processor circuit 121 and may include the docking station detector 136, the signal strength detector 138 or the position signal receiver 144 described above. The processor circuit 121 itself may perform some of the functions of the detector 120 including determining whether criteria are met and producing the proximity signal accordingly, as described above. The geographical position of the docking station 134 may be taken as the reference position in setting the criteria for setting the proximity signal active in response to the position signals, for example.

In addition the processor circuit 121 is configured to implement the first and second transmitters 122 and 124 whereby the first transmitter includes a message service interface 156 to facilitate transmitting a message via the transmitter 123 to the first monitoring unit 114, the message representing the proximity signal, for controlling the first receiver 113 of the first monitoring unit 114. In addition, the processor circuit 121 is configured to directly control the second receiver 119 to transmit the proximity signal thereto to cause it to enter the receive mode or non-receive mode, as appropriate, in response to the proximity signal and thus acts as the second transmitter 124. The message may be in any of the formats described above, for example.

When the proximity signal is set active to indicate the first monitoring unit 114 is in proximity to the second monitoring unit in response to whichever detector type is used, the processor circuit 121 sends a signal to the second receiver 119 causing it to enter its receive mode and causes a message to be sent to the first monitoring unit 114 using the transmitter 123, to cause the first receiver 113 of the first monitoring unit 114 to enter the low power mode. When the proximity signal is set inactive to indicate the first monitoring unit 114 is not in proximity to the second monitoring unit 116, the processor circuit 121 sends a signal to the second receiver 119 causing it to enter its non-receive mode and causes a message to be sent to the first monitoring unit to place the first receiver 113 thereof into the receive mode. In this way the second receiver 119 in the docking station receives the beacon signal from the mobile transmitter 112 when the first monitoring unit 114 is in proximity to the second monitoring unit 116 and the first receiver 113 in the first monitoring unit receives the beacon signal from the mobile transmitter when the first monitoring unit is not in proximity to the second monitoring unit.

While specific embodiments of the invention have been described and illustrated, such embodiments should be considered illustrative of the invention only and not as limiting the invention as construed in accordance with the accompanying claims.

What is claimed is:

1. A method for operating a monitoring unit operable to receive signals from a mobile transmitter in an electronic location monitoring system, the method comprising:
    causing a receiver of the monitoring unit to change a signal reception threshold thereof for receiving signals from the mobile transmitter, in response to proximity of the monitoring unit relative to a reference position whereby said receiver rejects signals received from the mobile transmitter that have a signal strength below said signal reception threshold and receives and processes signals received from the mobile transmitter that have a signal strength above said signal reception threshold.

2. The method of claim 1 wherein changing said signal reception threshold comprises causing said receiver to decrease said signal reception threshold when said monitoring unit is in proximity to said reference position and causing said receiver to increase said signal reception threshold when said monitoring unit is not in proximity to said reference position.

3. The method of claim 2 further comprising detecting proximity of said monitoring unit relative to said reference position.

4. The method of claim 3 further comprising producing a proximity signal for reception by said receiver, in response to detecting said change in proximity of said monitoring unit relative to said reference position, whereby the receiver changes said signal reception threshold in response to said proximity signal.

5. The method of claim 4 further comprising causing said proximity signal to indicate said monitoring unit is in proximity to said reference position when said monitoring unit is coupled to a docking station.

6. The method of claim 5 further comprising causing said proximity signal to indicate said monitoring unit is not in proximity to said reference position when said monitoring unit is uncoupled from a docking station.

7. The method of claim 4 further comprising receiving position signals at said monitoring unit, said position signals representing a geographical position of said monitoring unit, and producing said proximity signal in response to said position signals.

8. The method of claim 7 causing said proximity signal to indicate said monitoring unit is in proximity to said reference position when said position signals meet a first position criterion.

9. The method of claim 8 wherein said first position criterion is met when said position signals indicate said monitoring unit is within a first range of said reference position.

10. The method of claim 9 causing said proximity signal to indicate said monitoring unit is not in proximity to said reference position when said position signals meet a second position criterion.

11. The method of claim 10 wherein said second position criterion is met when said position signals indicate said monitoring unit is within a second range of said reference position.

12. An apparatus operable to receive signals from a mobile transmitter in an electronic location monitoring system, the apparatus comprising:
    a proximity signal generator operable to generate a proximity signal in response to proximity of the apparatus relative to a reference position;
    a receiver operable to receive signals from the mobile transmitter, said receiver having a signal reception threshold responsive to said proximity signal, such that said receiver rejects signals from the mobile transmitter that have a signal strength below said signal reception threshold and receives signals from the mobile transmitter that have a signal strength above said signal reception threshold; and
    a processor circuit operable to process signals received by said receiver to produce processed signals, said processor circuit being operable to communicate with a transmitter to cause the transmitter to transmit said processed signals to a monitoring station.

13. The apparatus of claim 12 wherein said receiver is operable to decrease said signal reception threshold when said proximity signal indicates the apparatus is in proximity to said reference position and wherein said receiver is operable to increase said signal reception threshold when said proximity signal indicates apparatus is not in proximity to said reference position.

14. The apparatus of claim 13 wherein said proximity signal generator comprises a detector operable to detect proximity of said apparatus to said reference position.

15. The apparatus of claim 14 wherein said detector is operable to detect coupling of said apparatus to a docking station, and to cause said proximity signal to indicate said apparatus is in proximity to said reference position when said apparatus is coupled to the docking station.

16. The apparatus of claim 15 wherein said detector is operable to detect uncoupling of said receiver from said docking station and to cause said proximity signal to indicate said apparatus is not in proximity to said reference position when said apparatus is uncoupled from the docking station.

17. The apparatus of claim 14 wherein said detector comprises a position signal receiver operable to receive position signals representing a geographical position of said apparatus, said proximity signal generator being operable to produce said proximity signal in response to said position signals.

18. The apparatus of claim 17 wherein said detector is operable to cause said proximity signal to indicate said apparatus is in proximity to said reference position when said position signals meet a first position criterion.

19. The apparatus of claim 18 wherein said detector is configured to determine said first position criterion is met when said position signals indicate said apparatus is within a first range of said reference position.

20. The apparatus of claim 19 wherein said detector is operable to cause said proximity signal to indicate said apparatus is not in proximity to said reference position when said position signals meet a second position criterion.

21. The apparatus of claim 20 wherein said detector is configured to determine said second position criterion is met when said position signals indicate said apparatus is within a second range of said reference position.

22. The apparatus of claim 17 wherein said position signal receiver comprises a global positioning system (GPS) signal receiver.

23. The apparatus of claim 17 wherein said position signal receiver includes a wireless receiver operable to receive position signals from a wireless communication network.

24. The apparatus of claim 17 wherein said position signal receiver comprises a message receiver operable to receive messages from a messaging system.

25. The apparatus of claim 24 wherein said message receiver is operable to receive messages from a Short Messaging System (SMS).

26. The apparatus of claim 12 further comprising a modular battery unit, said apparatus being incorporated into said modular battery unit.

27. The apparatus of claim 26 further comprising a first mobile wireless transceiver powered by said modular battery unit and in communication with said apparatus such that said wireless transceiver is operable to transmit said processed signals to the monitoring station.

28. The apparatus of claim 12 wherein said processor circuit is configured to implement a portion of said proximity signal generator.

29. The apparatus of claim 12 wherein said processor circuit is configured to cause said processed signals to include a representation of said proximity signal.

30. An apparatus operable to receive signals from a mobile transmitter in an electronic location monitoring system, the apparatus comprising:
means for generating a proximity signal in response to proximity of the apparatus relative to a reference position;
means for receiving signals from the mobile transmitter, said means for receiving having a signal reception threshold responsive to said proximity signal, such that signals from the mobile transmitter that have a signal strength below said signal reception threshold are rejected and such that signals from the mobile transmitter that have a signal strength above said signal reception threshold are received; and
means for processing signals received by said receiver to produce processed signals, said means for processing being operable to communicate with a transmitter to cause the transmitter to transmit said processed signals to a monitoring station.

31. The apparatus of claim 30 wherein said means for receiving is operable to decrease said signal reception threshold when said proximity signal indicates the apparatus is in proximity to said reference position and operable to increase said signal reception threshold when said proximity signal indicates apparatus is not in proximity to said reference position.

32. A method for switching monitoring units in an electronic location monitoring system comprising a mobile transmitter operable to transmit to at least one of first and second monitoring units operable to communicate with a common monitoring station, the method comprising:
detecting proximity of the first monitoring unit relative to the second monitoring unit;
producing a proximity signal in response to detecting proximity of the first monitoring unit relative to the second monitoring unit, for reception by the first monitoring unit to cause the first monitoring unit to enter a receive mode in which processing of signals received from the mobile transmitter by the first monitoring unit is permitted when the first monitoring unit is not in proximity to the second monitoring unit or a low power mode in which processing of signals received from the mobile transmitter by the first monitoring unit is prevented when the first monitoring unit is in proximity to the second monitoring unit; and
causing the second monitoring unit to receive and process signals from the mobile transmitter when said proximity signal indicates the first monitoring unit is in proximity to the second monitoring unit and causing the second monitoring unit to cease receiving signals from the mobile transmitter when said proximity signal indicates the first monitoring unit is not in proximity to the second monitoring unit.

33. The method of claim 32 further comprising causing said proximity signal to indicate the first monitoring unit is in proximity to the second monitoring unit when the first monitoring unit is coupled to a docking station associated with the second monitoring unit.

34. The method of claim 33 further comprising causing said proximity signal to indicate the first monitoring unit is not in proximity to the second monitoring unit when the first monitoring unit is uncoupled from a docking station associated with the second monitoring unit.

35. The method of claim 32 wherein detecting comprises measuring, near the second monitoring unit, signal strength of signals received from the mobile transmitter, and wherein said proximity signal is produced in response to measured signal strength.

36. The method of claim 35 causing said proximity signal to indicate the first monitoring unit is in proximity to the second monitoring unit when measured signal strength meets a first signal strength criterion.

37. The method of claim 36 wherein said first signal strength criterion is met when said measured signal strength is above a first signal strength threshold value.

38. The method of claim 37 causing said proximity signal to indicate the first monitoring unit is not in proximity to the second monitoring unit when measured signal strength meets a second signal strength criterion.

39. The method of claim 38 wherein said second signal strength criterion is met when said measured signal strength is below a second signal strength threshold value.

40. The method of claim 39 wherein said first and second signal strength threshold values are the same.

41. The method of claim 32 wherein detecting comprises receiving position signals at the first monitoring unit, said position signals representing a geographical position of the first monitoring unit, and producing said proximity signal in response to said position signals.

42. The method of claim 41 causing said proximity signal to indicate the first monitoring unit is in proximity to the second monitoring unit when said position signals meet a first position criterion.

43. The method of claim 42 wherein said first position criterion is met when said position signals indicate the first monitoring unit is within a first range of a reference position.

44. The method of claim 43 causing said proximity signal to indicate the first monitoring unit is not in proximity to the second monitoring unit when said position signals meet a second position criterion.

45. The method of claim 44 wherein said second position criterion is met when said position signals indicate the first monitoring unit is within a second range of said reference position.

46. The method of claim 45 wherein said reference position represents an approximate geographical position of the second monitoring unit.

47. The method of claim 32 wherein producing said proximity signal comprises causing a message to be transmitted to the first monitoring unit.

48. The method of claim 47 wherein causing a message to be transmitted to the first monitoring unit comprises causing a message to be transmitted to the first monitoring unit through a messaging service.

49. The method of claim 48 wherein causing a message to be transmitted to the first monitoring unit through a messaging service comprises causing a Short Messaging Service (SMS) message to be transmitted to the first monitoring unit.

50. The method of claim 49 wherein said SMS message includes a power down command when the first monitoring unit is in proximity to the second monitoring unit and wherein said SMS message includes a power up command when the first monitoring unit is not in proximity to the second monitoring unit.

51. An apparatus for switching monitoring units in an electronic location monitoring system comprising a mobile transmitter operable to transmit to at least one of first and second monitoring units operable to process signals received from the mobile transmitter and transmit processed signals to a monitoring station, the apparatus comprising:
    a detector operable to produce a proximity signal indicating proximity of the first monitoring unit relative to the second monitoring unit;
    a first transmitter operable to cause said proximity signal to be communicated to the first monitoring unit such that, when the proximity signal indicates the first monitoring unit is in proximity to the second monitoring unit the first monitoring unit enters a low power mode in which signals are not received from the mobile transmitter by the first monitoring unit and when the proximity signal indicates that the first monitoring unit is not in proximity to the second monitoring unit the first monitoring unit enters a receive mode in which signals from the mobile transmitter are received and processed by the first monitoring unit; and
    a second transmitter operable to cause said proximity signal to be transmitted to the second monitoring unit such that in response to the proximity signal the second monitoring unit receives and processes signals from the mobile transmitter when said proximity signal indicates the first monitoring unit is in proximity to the second monitoring unit and ceases receiving signals from the mobile transmitter when said proximity signal indicates the first monitoring unit is not in proximity to the second monitoring unit.

52. The apparatus of claim 51 wherein said detector is operable to cause said proximity signal to indicate the first monitoring unit is in proximity to the second monitoring unit when the first monitoring unit is coupled to a docking station.

53. The apparatus of claim 52 wherein said detector is operable to cause said proximity signal to indicate the first monitoring unit is not in proximity to the second monitoring unit when the first monitoring unit is uncoupled from a docking station.

54. The apparatus of claim 51 wherein said detector comprises a signal strength detector operable to detect signal strength of signals received from the mobile transmitter, and wherein said detector produces said proximity signal in response to measured signal strength.

55. The apparatus of claim 54 wherein said detector causes said proximity signal to indicate the first monitoring unit is in proximity to the second monitoring unit when measured signal strength meets a first signal strength criterion.

56. The apparatus of claim 55 wherein said detector determines said first signal strength criterion is met when said measured signal strength is above a first signal strength threshold value.

57. The apparatus of claim 56 wherein said detector causes said proximity signal to indicate the first monitoring unit is not in proximity to the second monitoring unit when measured signal strength meets a second signal strength criterion.

58. The apparatus of claim 57 wherein said detector determines said second signal strength criterion is met when said measured signal strength is below a second signal strength threshold value.

59. The apparatus of claim 58 wherein said first and second signal strength threshold values are the same.

60. The apparatus of claim 51 wherein said detector comprises a position signal receiver operable to receive position signals representing a geographical position of the first monitoring unit, and wherein said detector produces said proximity signal in response to said position signals.

61. The apparatus of claim 60 wherein said detector causes said proximity signal to indicate the first monitoring unit is in proximity to the second monitoring unit when said position signals meet a first position criterion.

62. The apparatus of claim 61 wherein said detector determines said first position criterion is met when said position signals indicate the first monitoring unit is within a first range of a reference position.

63. The apparatus of claim 62 wherein said detector causes said proximity signal to indicate the first monitoring unit is not in proximity to the second monitoring unit when said position signals meet a second position criterion.

64. The apparatus of claim 63 wherein said detector determines said second position criterion is met when said position signals indicate the first monitoring unit is within a second range of said reference position.

65. The apparatus of claim 64 wherein said reference position represents an approximate geographical position of the second monitoring unit.

66. The apparatus of claim 51 wherein said first transmitter is operable to transmit a message representing said proximity signal to the first monitoring unit.

67. The apparatus of claim 66 further comprising a first messaging service interface operable to transmit a message to the first monitoring unit through a messaging service.

68. The apparatus of claim 67 wherein said first messaging service interface is operable to transmit a message compatible with a Short Messaging Service (SMS) format to be transmitted to the first monitoring unit.

69. The apparatus of claim 51 wherein said second transmitter is operable to transmit a message representing said proximity signal to the second monitoring unit.

70. The apparatus of claim 69 further comprising a second messaging service interface operable to transmit a message to the second monitoring unit through a messaging service.

71. The apparatus of claim 70 wherein said second messaging service interface is operable to transmit a message compatible with a Short Messaging Service (SMS) format to be transmitted to the second monitoring unit.

72. The apparatus of claim 51 further comprising a modular battery unit, operable to power the first monitoring unit, said detector, said first transmitter and said second transmitter being incorporated into said modular battery unit.

73. The apparatus of claim 51 further comprising a housing, wherein said detector, said first transmitter, said second transmitter and the second monitoring unit are housed in said housing.

74. The apparatus of claim 73 wherein said housing has a docking station to facilitate docking of the first monitoring unit.

75. An apparatus for use in an electronic location monitoring system, the apparatus comprising:
a first monitoring unit comprising:
a first receiver operable to receive signals from a mobile transmitter on a person to be monitored, the first receiver having a low power mode in which signals are not received from the mobile transmitter and a receive mode in which signals from the mobile transmitter are received;
a processor circuit for processing signals received by said first receiver to produce processed signals; and
a transmitter operable to transmit said processed signals to a monitoring station; and
a signaling unit comprising:
a detector operable to produce a proximity signal indicating proximity of the first monitoring unit relative to a second monitoring unit operable to receive, process and transmit signals to the monitoring station;
said first receiver being responsive to said proximity signal such that, when the proximity signal indicates the first monitoring unit is in proximity to the second monitoring unit the first receiver is placed in the low power mode and when the proximity signal indicates that the first monitoring unit is not in proximity to the second monitoring unit the first receiver enters the receive mode;
a proximity signal transmitter operable to cause said proximity signal to be transmitted to the second monitoring unit, whereby in response to the proximity signal the second monitoring unit receives and processes signals from the mobile transmitter when said proximity signal indicates said first monitoring unit is in proximity to the second monitoring unit and ceases receiving signals from the mobile transmitter when said proximity signal indicates said first monitoring unit is not in proximity to the second monitoring unit, whereby said first monitoring unit receives and processes signals from the mobile transmitter and the second monitoring unit does not receive and process signals from the mobile transmitter when said first monitoring unit is not in proximity to the second monitoring unit and whereby the second monitoring unit receives and processes signals from the mobile transmitter and said first monitoring unit does not receive and process signals from the mobile transmitter when said first monitoring unit is in proximity to the second monitoring unit.

76. The apparatus of claim 75 further comprising a modular battery unit operable to power said first monitoring unit and said signaling unit and wherein said first monitoring unit and said signaling unit are housed in said modular battery unit.

77. The apparatus of claim 75 further comprising a portable wireless communication appliance, said apparatus being incorporated into said portable wireless communication appliance.

78. The apparatus of claim 77 wherein said portable wireless communication appliance includes a cellular telephone.

79. The apparatus of claim 75 wherein said detector is operable to cause said proximity signal to indicate said first monitoring unit is in proximity to the second monitoring unit when said first monitoring unit is coupled to a docking station.

80. The apparatus of claim 79 wherein said detector is operable to cause said proximity signal to indicate said first monitoring unit is not in proximity to the second monitoring unit when said first monitoring unit is uncoupled from a docking station.

81. The apparatus of claim 76 wherein said detector comprises a signal strength detector operable to detect signal strength of signals received from said mobile transmitter, and wherein said detector produces said proximity signal in response to measured signal strength.

82. The apparatus of claim 81 wherein said detector causes said proximity signal to indicate said first monitoring unit is in proximity to the second monitoring unit when measured signal strength meets a first signal strength criterion.

83. The apparatus of claim 82 wherein said detector determines said first signal strength criterion is met when said measured signal strength is above a first signal strength threshold value.

84. The apparatus of claim 83 wherein said detector causes said proximity signal to indicate said first monitoring unit is not in proximity to the second monitoring unit when measured signal strength meets a second signal strength criterion.

85. The apparatus of claim 84 wherein said detector determines said second signal strength criterion is met when said measured signal strength is below a second signal strength threshold value.

86. The apparatus of claim 85 wherein said first and second signal strength threshold values are the same.

87. The apparatus of claim 75 wherein said detector comprises a position signal receiver operable to receive position signals representing a geographical position of said first monitoring unit, and wherein said detector produces said proximity signal in response to said position signals.

88. The apparatus of claim 87 wherein said detector causes said proximity signal to indicate said first monitoring unit is in proximity to the second monitoring unit when said position signals meet a first position criterion.

89. The apparatus of claim 88 wherein said detector determines said first position criterion is met when said position signals indicate said first monitoring unit is within a first range of a reference position.

90. The apparatus of claim 89 wherein said detector causes said proximity signal to indicate said first monitoring unit is not in proximity to the second monitoring unit when said position signals meet a second position criterion.

91. The apparatus of claim 90 wherein said detector determines said second position criterion is met when said position signals indicate said first monitoring unit is within a second range of said reference position.

92. The apparatus of claim 91 wherein said reference position represents an approximate geographical position of the second monitoring unit.

93. The apparatus of claim 75 wherein said proximity signal transmitter is operable to transmit a message representing said proximity signal to the second monitoring unit.

94. The apparatus of claim 93 further comprising a messaging service interface operable to transmit a message to the second monitoring unit through a messaging service.

95. The apparatus of claim 94 wherein said messaging service interface is operable to transmit a message compatible with a Short Messaging Service (SMS) format to be transmitted to the second monitoring unit.

96. A docking apparatus for a first monitoring unit in an electronic location monitoring system in which the first monitoring unit has a first receiver operable to receive signals from a mobile transmitter on a person to be monitored and wherein said first monitoring unit is operable to process said signals to produce processed signals and to transmit said processed signals to a monitoring station, the docking apparatus comprising:

a second monitoring unit comprising:
  a second receiver operable to receive signals from the mobile transmitter, the second receiver having a non-receive mode in which signals are not received from the mobile transmitter and a receive mode in which signals from the mobile transmitter are received;
  a processor circuit for processing signals received by said second receiver to produce processed signals; and
  a transmitter operable to transmit said processed signals to a monitoring station; and
a signaling unit comprising:
  a detector operable to produce a proximity signal indicating proximity of the first monitoring unit relative to the second monitoring unit;
  said second receiver being responsive to said proximity signal such that, when the proximity signal indicates the first monitoring unit is in proximity to the second monitoring unit the second receiver is placed in the receive mode and when the proximity signal indicates that the first monitoring unit is not in proximity to the second receiver is placed in the non-receive mode;
  a proximity signal transmitter operable to cause said proximity signal to be transmitted to the first monitoring unit, whereby in response to the proximity signal the first monitoring unit receives and processes signals from the mobile transmitter when said proximity signal indicates said first monitoring unit is not in proximity to the second monitoring unit and ceases receiving signals from the mobile transmitter when said proximity signal indicates said first monitoring unit is in proximity to the second monitoring unit,
  whereby said first monitoring unit receives and processes signals from the mobile transmitter and the second monitoring unit does not receive and process signals from the mobile transmitter when said first monitoring unit is not in proximity to the second monitoring unit and whereby the second monitoring unit receives and processes signals from the mobile transmitter and said first monitoring unit does not receive and process signals from the mobile transmitter when said first monitoring unit is in proximity to the second monitoring unit.

97. The apparatus of claim 96 wherein said docking station apparatus includes a docking port to which the first monitoring unit may be coupled.

98. The apparatus of claim 97 wherein said detector is operable to cause said proximity signal to indicate the first monitoring unit is in proximity to said second monitoring unit when the first monitoring unit is coupled to said docking station.

99. The apparatus of claim 97 wherein said detector is operable to cause said proximity signal to indicate the first monitoring unit is not in proximity to said second monitoring unit when the first monitoring unit is uncoupled from said docking station.

100. The apparatus of claim 96 wherein said detector comprises a signal strength detector operable to detect signal strength of signals received from said mobile transmitter, and wherein said detector produces said proximity signal in response to measured signal strength.

101. The apparatus of claim 100 wherein said detector causes said proximity signal to indicate the first monitoring unit is in proximity to said second monitoring unit when measured signal strength meets a first signal strength criterion.

102. The apparatus of claim 101 wherein said detector determines said first signal strength criterion is met when said measured signal strength is above a first signal strength threshold value.

103. The apparatus of claim 102 wherein said detector causes said proximity signal to indicate the first monitoring unit is not in proximity to said second monitoring unit when measured signal strength meets a second signal strength criterion.

104. The apparatus of claim 103 wherein said detector determines said second signal strength criterion is met when said measured signal strength is below a second signal strength threshold value.

105. The apparatus of claim 104 wherein said first and second signal strength threshold values are the same.

106. The apparatus of claim 63 wherein said detector comprises a position signal receiver operable to receive position signals representing a geographical position of the first monitoring unit, and wherein said detector produces said proximity signal in response to said position signals.

107. The apparatus of claim 106 wherein said detector causes said proximity signal to indicate the first monitoring unit is in proximity to said second monitoring unit when said position signals meet a first position criterion.

108. The apparatus of claim 107 wherein said detector determines said first position criterion is met when said position signals indicate the first monitoring unit is within a first range of a reference position.

109. The apparatus of claim 108 wherein said detector causes said proximity signal to indicate the first monitoring unit is not in proximity to said second monitoring unit when said position signals meet a second position criterion.

110. The apparatus of claim 109 wherein said detector determines said second position criterion is met when said position signals indicate the first monitoring unit is within a second range of said reference position.

111. The apparatus of claim 110 wherein said reference position represents an approximate geographical position of said second monitoring unit.

112. The apparatus of claim 96 wherein the first transmitter is operable to transmit a message representing said proximity signal to the first monitoring unit.

113. The apparatus of claim 112 further comprising a messaging service interface operable to transmit a message to the first monitoring unit through a messaging service.

114. The apparatus of claim 113 wherein said messaging service interface is operable to transmit a message compatible with a Short Messaging Service (SMS) format to be transmitted to the first monitoring unit.

* * * * *

UNITED STATES PATENT AND TRADEMARK OFFICE
CERTIFICATE OF CORRECTION

| | |
|---|---|
| PATENT NO. | : 7,446,656 B2 |
| APPLICATION NO. | : 10/569584 |
| DATED | : February 22, 2006 |
| INVENTOR(S) | : Douglas H. Blakeway |

Page 1 of 1

It is certified that error appears in the above-identified patent and that said Letters Patent is hereby corrected as shown below:

On the title page, item (73), "Strategic Technologies Inc., Surrey, British Columbia (CA)" should be -- G4S Justice Services (Canada) Inc., Surrey, British Columbia (CA) --.

Signed and Sealed this

Seventeenth Day of February, 2009

JOHN DOLL
*Acting Director of the United States Patent and Trademark Office*

UNITED STATES PATENT AND TRADEMARK OFFICE
CERTIFICATE OF CORRECTION

PATENT NO.        : 7,446,656 B2
APPLICATION NO.   : 10/569584
DATED             : November 4, 2008
INVENTOR(S)       : Douglas H. Blakeway It is certified that error appears in the above-identified patent and that said Letters Patent is hereby corrected as shown below:

On the title page, item (73), "Strategic Technologies Inc., Surrey, British Columbia (CA)" should be -- G4S Justice Services (Canada) Inc., Surrey, British Columbia (CA) --.

This certificate supersedes the Certificate of Correction issued February 17, 2009.

Signed and Sealed this

Seventeenth Day of March, 2009

JOHN DOLL
*Acting Director of the United States Patent and Trademark Office*